(12) United States Patent
Yoder et al.

(10) Patent No.: US 9,880,946 B1
(45) Date of Patent: Jan. 30, 2018

(54) DATA TRANSFER TECHNIQUES WITH DATA REPLICATION

(71) Applicant: EMC IP Holding Company LLC, Hopkinton, MA (US)

(72) Inventors: Benjamin Yoder, Westborough, MA (US); Bhaskar Bora, Bangalore (IN)

(73) Assignee: EMC IP Holdings Company LLC, Hopkinton, MA (US)

( * ) Notice: Subject to any disclaimer, the term of this patent is extended or adjusted under 35 U.S.C. 154(b) by 163 days.

(21) Appl. No.: 14/755,210

(22) Filed: Jun. 30, 2015

(51) Int. Cl.
*G06F 12/12* (2016.01)
*G06F 12/121* (2016.01)
*G06F 12/0808* (2016.01)

(52) U.S. Cl.
CPC ........ *G06F 12/121* (2013.01); *G06F 12/0808* (2013.01); *G06F 2212/62* (2013.01); *G06F 2212/69* (2013.01)

(58) Field of Classification Search
CPC ............... G06F 12/121; G06F 12/0808; G06F 2212/62; G06F 2212/69
See application file for complete search history.

(56) References Cited

U.S. PATENT DOCUMENTS

| | | | | |
|---|---|---|---|---|
| 5,206,939 A * | 4/1993 | Yanai | ..................... | G06F 3/0601 360/48 |
| 5,381,539 A * | 1/1995 | Yanai | ................... | G06F 12/0862 711/129 |
| 5,544,347 A * | 8/1996 | Yanai | ..................... | G06F 3/0601 711/162 |
| 5,719,885 A * | 2/1998 | Ofer | ..................... | G06F 11/1076 714/6.1 |
| 5,742,792 A | 4/1998 | Yanai et al. | | |
| 6,732,194 B1 * | 5/2004 | Kopylovitz | ........... | G06F 3/0611 710/36 |
| 6,742,138 B1 * | 5/2004 | Gagne | ................. | G06F 11/1471 714/6.31 |
| 6,968,369 B2 | 11/2005 | Veprinsky et al. | | |
| 7,054,883 B2 | 5/2006 | Meiri et al. | | |

(Continued)

OTHER PUBLICATIONS

Dec. 4, 2015, "HYPERMAX OS (Enginuity) 5977.497.471".

(Continued)

*Primary Examiner* — David X Yi
*Assistant Examiner* — Ramon A Mercado
(74) *Attorney, Agent, or Firm* — Muirhead and Saturnelli, LLC

(57) ABSTRACT

Described are data replication techniques. Y cycles of writes directed to a first storage device of a first data storage system are collected, Y>2. Each of the Y cycles denotes writes directed to the first storage device at an occurrence of a fixed time interval. Writes of cycle N-1 directed to the first storage device are transmitted from the first data storage system to a second data storage system. Writes of cycle N-2 are applied to a second storage device. An acknowledgement regarding cycle N-1 is sent from the second data storage system to the first data storage system responsive to determining that the writes of cycle N-1 directed to the first storage device have been received by the second data storage system and that the writes of cycle N-2 directed to the first storage device have been applied to the second storage device.

15 Claims, 28 Drawing Sheets

(56) References Cited

U.S. PATENT DOCUMENTS

| | | | | |
|---|---|---|---|---|
| 7,624,229 B1* | 11/2009 | Longinov | ............ | G06F 12/0806 |
| | | | | 711/113 |
| 7,702,871 B1* | 4/2010 | Arnon | .................... | G06F 3/0611 |
| | | | | 711/114 |
| 8,145,865 B1* | 3/2012 | Longinov | ............ | G06F 11/2066 |
| | | | | 711/165 |
| 8,707,003 B1* | 4/2014 | Mishra | .................. | G06F 3/0611 |
| | | | | 711/112 |
| 8,732,124 B1* | 5/2014 | Arnon | ................. | G06F 11/1464 |
| | | | | 707/613 |
| 2016/0098295 A1* | 4/2016 | Ash | ..................... | G06F 12/0875 |
| | | | | 718/106 |

OTHER PUBLICATIONS

Bhaskar Bora, et al., "Data Transfer Techniques With Data Replication", U.S. Appl. No. 14/672,652, filed Mar. 30, 2015.

Bhaskar Bora, et al., U.S. Appl. No. 14/672,652, filed Mar. 30, 2015, "Data Transfer Techniques With Data Replication".

* cited by examiner

DATA TRANSFER TECHNIQUES WITH DATA REPLICATION

BACKGROUND

Technical Field

This application generally relates to data storage and more particularly to techniques used in connection with data replication.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. Such mirroring may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of the invention is a method of performing data replication comprising: collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein writes of cycle N denotes a most recent one of the Y cycles of writes collected, N being an integer identifying a particular fixed interval occurrence during which writes directed to the first storage device are received; transmitting writes of cycle N−1 directed to the first storage device from the first data storage system to a second data storage system; applying writes of cycle N−2 directed to the first storage device to a second storage device of the second data storage system; determining when the writes of cycle N−1 directed to the first storage device have been received by the second data storage system and when the writes of cycle N−2 directed to the first storage device have been applied to the second storage device; and sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device. The method may also include transmitting at least some of the writes of cycle N directed to the first storage device from the first data storage system to the second data storage system prior to the first data storage system receiving the acknowledgement regarding cycle N−1. The first storage device and the second storage device may be logical devices. No write from cycle N−1 directed to the first storage device may be applied to the second storage device until all writes of cycle N−2 directed to the first storage device are applied to the second storage device. No write from cycle N directed to the first storage device may be applied to the second storage device until all writes of cycle N−1 directed to the first storage device are applied to the second storage device. The method may also include performing a cycle switch to set a current cycle number to N responsive to the first data storage system receiving the acknowledgement regarding cycle N−1, wherein transmitting at least some of the writes of cycle N that are directed to the first storage device to the second data storage system is performed prior to performing the cycle switch to cycle N. The second data storage system may determine that writes of cycle N−1 directed to the first storage device have been applied to the second storage device when write data of each write included in cycle N−1 directed to the first storage device is any of: stored as write pending data in a cache of the second data storage system, and destaged to a location on a physical storage device provisioned for the second storage device. Writes of the Y cycles may be stored in a first cache of the first data storage system and the method further may further include determining that a maximum threshold amount of the first cache of the first data storage system has been consumed; and responsive to determining that the maximum threshold amount of the first cache has been consumed, performing spillover processing to move a first portion of writes of the Y cycles from the first cache to one or more secondary storage devices. Spillover processing may include selecting a plurality of cache slots from the first cache including the first portion of writes; storing write data for the first portion of writes in a packed format in a first set of one or more packed slots on the one or more secondary storage devices; and denoting the plurality of cache slots of the first cache as free and available for reuse. The method may include determining whether it is time to commence preparation processing to transmit writes for a first of the Y cycles from the first data storage system to the second data storage system; and responsive to determining it is time to commence the preparation processing, performing the preparation processing comprising: determining whether any writes of the first of the Y cycles are currently stored on the one or more secondary storage devices thereby indicating that the spillover processing has been performed for at least some writes of the first of the Y cycles; and if it is determined that any writes of the first of the Y cycles are currently stored on the one or more secondary storage devices, performing spillback processing to move writes of first cycle currently stored on the one or more secondary storage devices to the first cache of the first data storage system. Prior to performing the preparation processing, a first portion of writes of the first cycle may be stored on the one or more secondary storage devices in the packed format and a remaining portion of the writes of the first cycle are stored in the first cache. Preparation processing may include storing the first portion of writes of the first cycle in the first cache in the packed format.

In accordance with another aspect of the invention is a system comprising: a first data storage system includes a first storage device and operates in accordance with a multiple cycle mode; a second data storage system that includes a second storage device and operates in accordance with the multiple cycle mode; a third data storage system that includes third storage device and operates in accordance with the multiple cycle mode, wherein the first data storage system communicates with the third data storage system, and wherein cycle of writes performed to the first storage device are transmitted from the first data storage system to the third data storage system and applied to the third storage device; a fourth data storage system that includes a fourth storage device and operates in accordance with the multiple cycle mode, wherein the second data storage system communicates with the fourth data storage system, and wherein cycle of writes performed to the second storage device are transmitted from the second data storage system to the fourth data storage system and applied to the fourth storage device; a host comprising code stored in a memory that, when executed, performs a method comprising: synchronizing commencement of each new cycle of writes collected on the first data storage system and the second data storage system; and synchronizing application of each same cycle of writes applied to the second storage device and the fourth storage device. Each of the first data storage system, the second data storage system, the third data storage system, and the fourth data storage system may include code stored in a memory that, when executed, performs a method comprising: collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein writes of cycle N denotes a most recent one of the Y cycles of writes collected, N being an integer identifying a particular fixed interval occurrence during which writes directed to the first storage device are received. Each of the first data storage system, the second data storage system, the third data storage system, and the fourth data storage system may operate in accordance with a pre-transfer mode.

In accordance with another aspect of the invention is a computer readable medium comprising code stored thereon that, when executed, performs a method of data replication comprising: collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein the first data storage system operates in accordance with a multiple cycle mode, a pre-transfer mode and a legacy mode, and wherein a second data storage system is a legacy data storage system and does not operate in accordance with the multiple cycle mode and does not operate in accordance with the pre-transfer mode; tracking, by the first data storage system, a mapping of multiple cycles of the multiple cycle mode to each legacy cycle used by the second data storage system, wherein the Y cycles denote cycles of the multiple cycle mode and wherein each legacy cycle used by the second data storage system includes a plurality of cycles of writes collected by the first data storage system in accordance with the multiple cycle mode; receiving writes of a legacy cycle A directed to the first storage device, A being an integer denoting a particular legacy cycle number; transmitting writes of legacy cycle A−1 directed to the first storage device from the first data storage system to the second data storage system; applying writes of legacy cycle A−2 directed to the first storage device to a second storage device of the second data storage system; determining when the writes of legacy cycle A−1 directed to the first storage device have been received by the second data storage system and when the writes of legacy cycle A−2 directed to the first storage device have been applied to the second storage device; and sending, from the second data storage system to the first data storage system, an acknowledgement regarding legacy cycle A−1 responsive to determining that the writes of legacy cycle A−1 directed to the first storage device have been received by the second data storage system and that the writes of legacy cycle A−2 directed to the first storage device have been applied to the second storage device. The method may include responsive to the first data storage system receiving, from the second data storage system, the acknowledgement regarding legacy cycle A−1, updating a current legacy cycle to A and commencing transmission of legacy cycle A writes from the first data storage system to the second data storage system. The first storage device and the second storage device may be logical devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
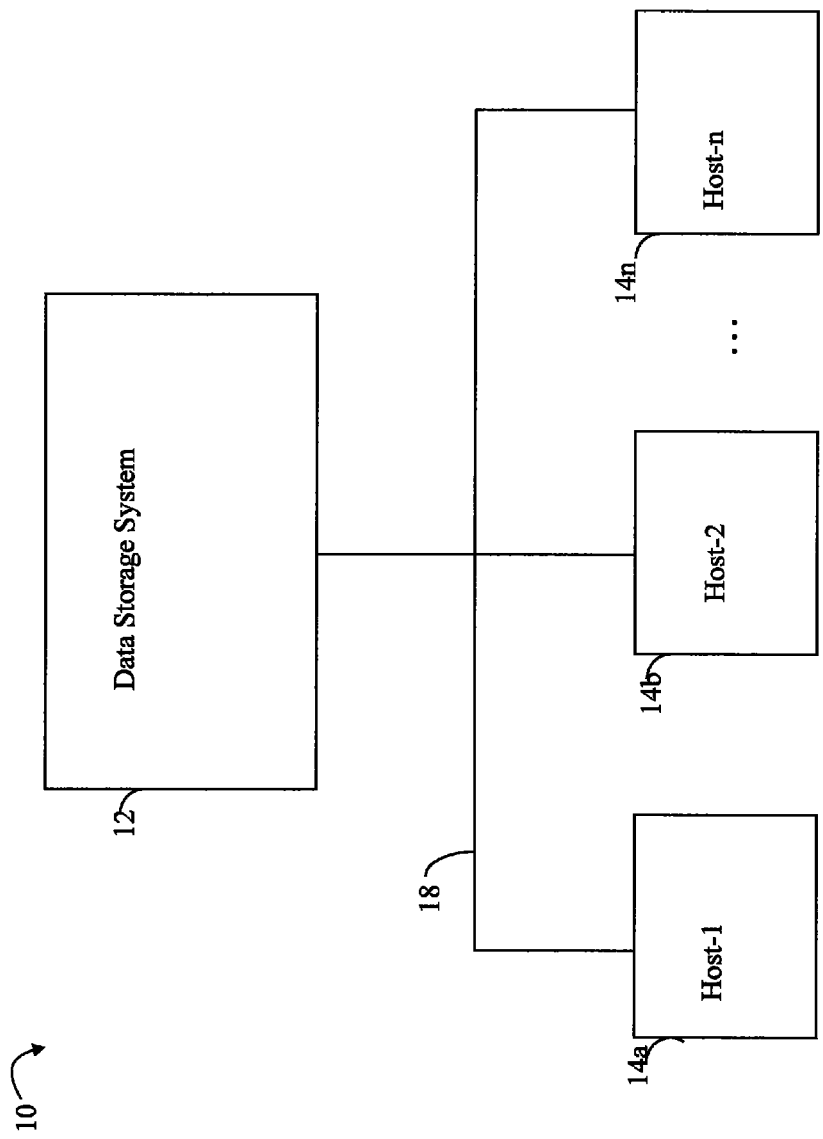
FIG. 1 is an example of an embodiment of a computer system that may utilize the techniques described herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
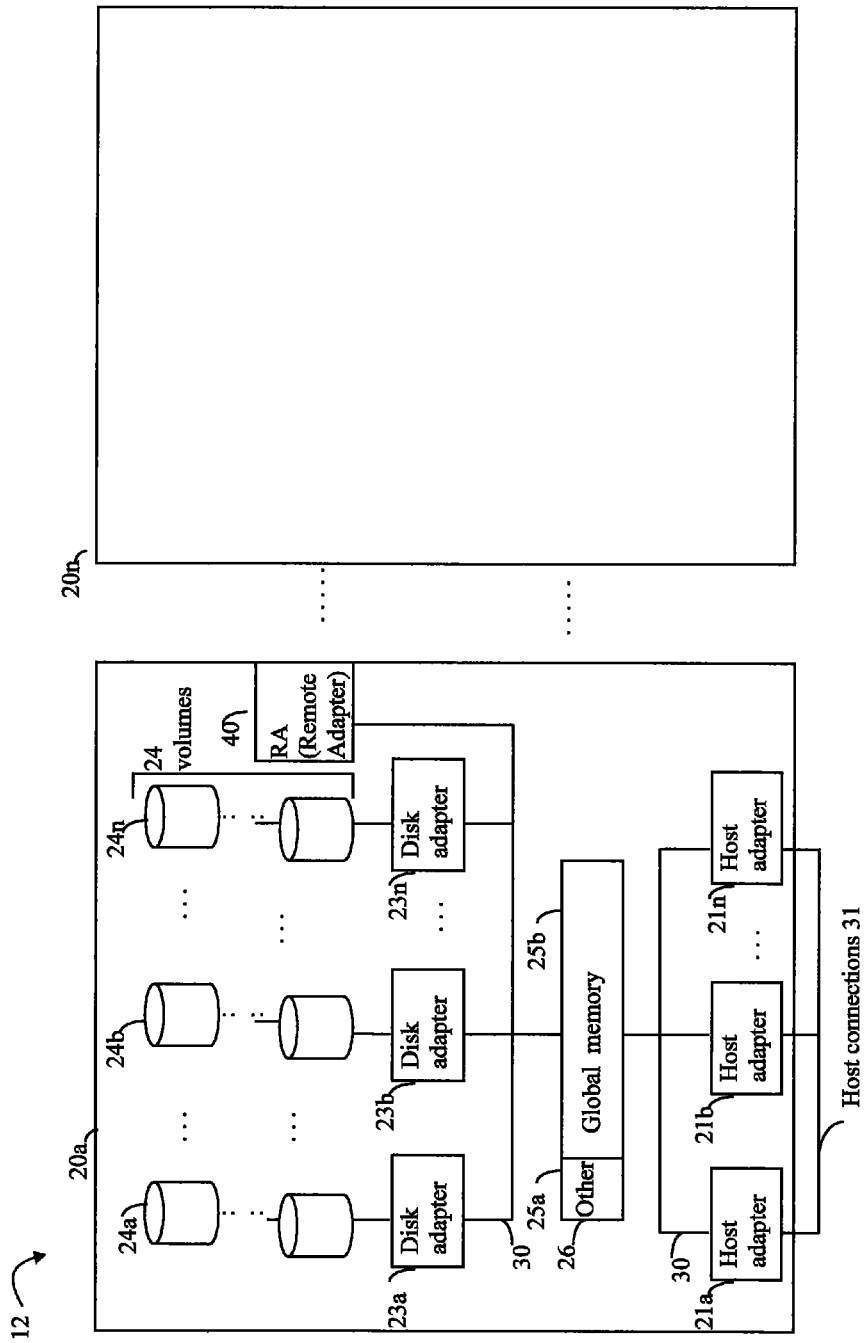
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
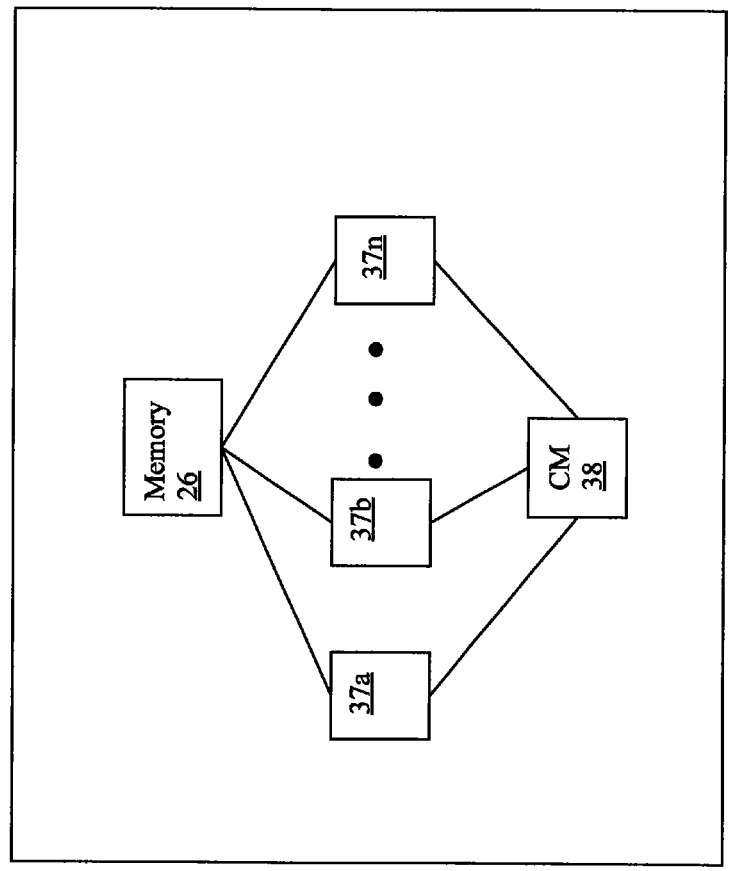
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
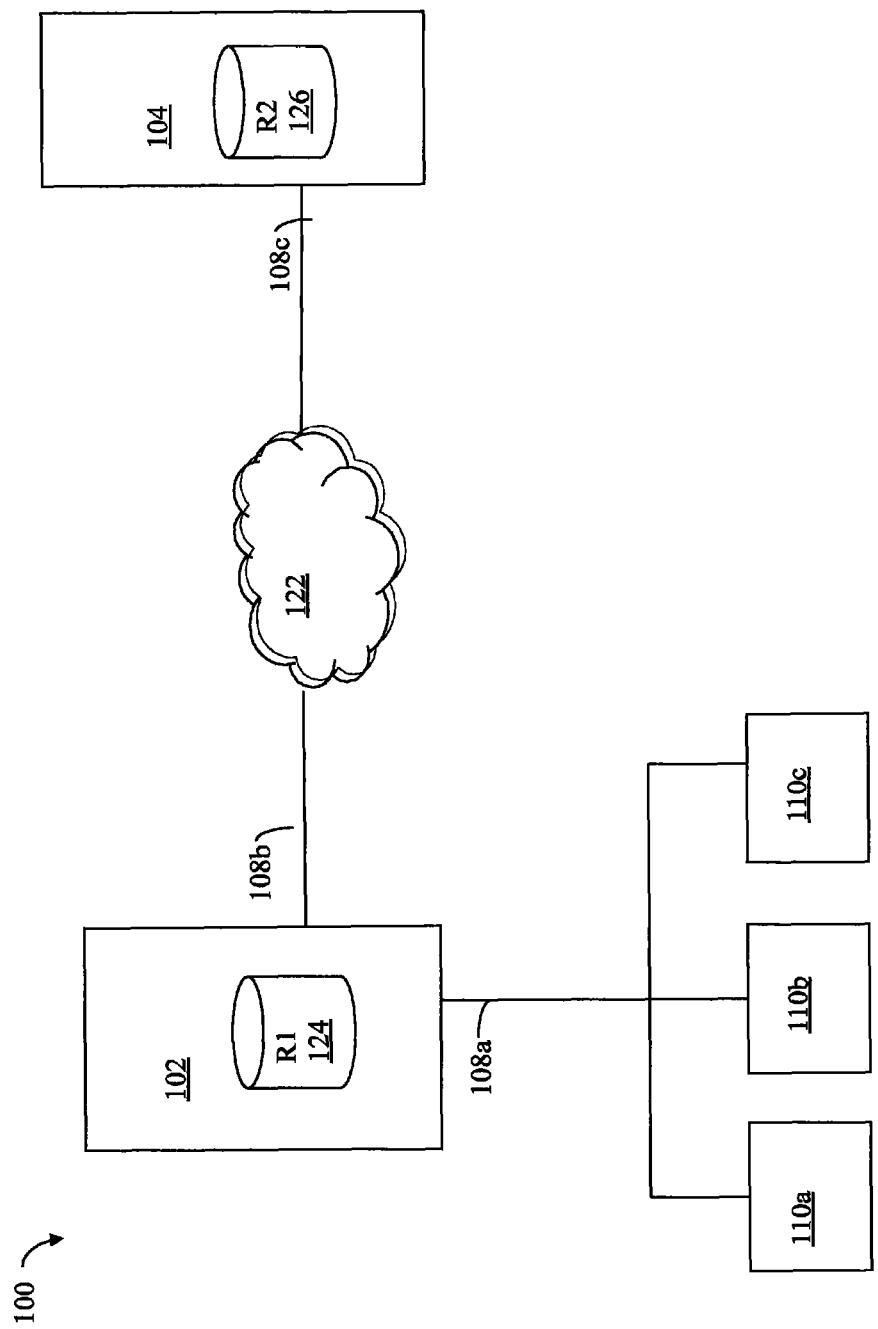
FIGS. 3 and 4 are example representations of components of a system that may be used in connection with the techniques herein.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more devices. In this example, data storage system 102 includes device R1 124 and data storage system 104 includes device R2 126. Both of the data storage systems may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Data storage device communication between Symmetrix™ data storage systems using SRDF® is described, for example, in U.S. Pat. Nos. 5,742, 792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968, 369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication in an asynchronous manner such as SRDF® operating in an asynchronous mode (SRDF®/A). With asynchronous mode remote data replication, a consistent point in time image is provided on the target R2 device that is only slightly behind (in terms of writes performed) the source R1 device. With asynchronous data replication such as with SRDF®/A, changes or writes to the first device or group of devices are collected for each occurrence of a time period, such as every X seconds, and then transferred to the R2 system to be applied to the second R2 device or group of devices. Although the remote R2 copy of the data will never be as current as the primary R1 copy, this method can replicate data over considerable distances and with reduced bandwidth requirements and minimal impact on host performance.

Each time period (e.g., X seconds, X>0) for which writes are collected or captured may also be referred to as a cycle or delta set having an associated cycle or sequence number. Thus, writes directed to an R1 device may be collected for cycle 1, cycle 2, and the like, whereby the sequence or cycle number denotes the particular time period in a sequence of successive time periods for which writes are collected. In an embodiment in accordance with techniques herein, dependent write consistency may be provided by processing and preserving all writes to the destination R2 system in ordered sequential numbered sets. In this manner, the writes of each cycle may be applied in a sequential ordering to the R2 device based on the cycle or sequence number associated with each cycle of writes. Dependent write consistency refers to the maintenance of consistent replica data between the R1 source device and R2 destination device.

In one embodiment, writes collected within the same single cycle (e.g., writes having the same sequence or cycle number) may be applied in any order to the R2 device whereby such writes may be characterized as being write order independent. As writes during a time period or cycle are recorded, additional processing may be performed to obtain a final set of write operations actually transmitted from the R1 to the R2 data storage system whereby such writes in the final set are write order independent. For example, write folding may be performed for writes in a single capture cycle whereby if a single portion of data is updated multiple times, only the final or most recent data update is actually included in the final set transmitted to the R2 system. Since consistency is maintained between cycles, if replication stops, processing is performed to ensure that either a fully received cycle of write data is applied to the R2 device, or is otherwise discarded.

In one embodiment, a write may be included in a particular cycle if processing of the write operation has commenced within the time period of that particular cycle.

For each collection or cycle N of write data directed to the R1 device having an associated sequence number, processing may include a data collection or capture phase, a transmit or transmission phase, a receive phase and a restore or apply phase. Generally, writes are collected for a time period or a particular cycle in a capture phase on the R1 system, SRDF®/A transfers a cycle of data in the transmit phase from the R1 system to the R2 system, the receive phase on the R2 system receives data from the transmit phase, and the apply or restore phase with respect to a particular cycle refers to applying the cycle of data to the R2 device.

Figure 4:
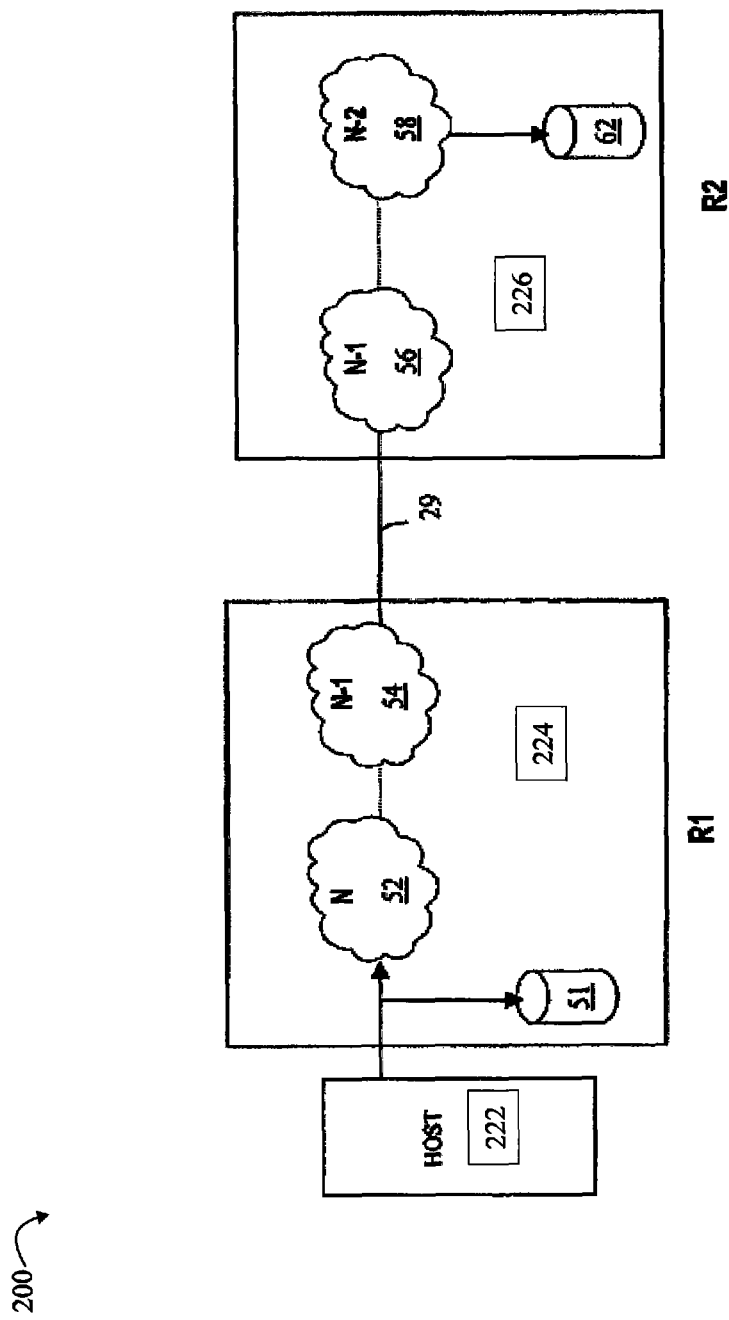

Referring to FIG. 4, a path of data is illustrated from the host 222 to the local R1 storage system 224 and the remote R2 storage system 226. Data written from the host 22 to the local storage system 225 is stored locally, as illustrated by the storage device 51. The data that is written by the host 222 to the local storage system 224 is also maintained by the local storage system 224 in connection with being sent by the local storage system 224 to the remote storage system 226 via the link 29.

In FIG. 4, the writes by the host 222 collected or captured for cycle N are shown as being assigned sequence number N, where N may be greater than zero in a system where the first cycle is denoted by 1. All of the writes performed by the host 22 that are assigned sequence number N are collected in a single chunk of data 52. The chunk 52 represents a plurality of separate writes by the host 22 that occur during a single collection cycle or time period.

Generally, the local storage system 224 accumulates writes of one sequence number or chunk while transmitting a previously accumulated chunk (having the previous sequence number) to the remote storage system 226. Thus, while the local storage system 224 is accumulating writes from the host 222 that are assigned sequence number N, the writes that occurred for the previous sequence number (N−1) are transmitted by the local storage system 224 to the remote storage system 226 via the link 29. A chunk 54 represents writes from the host 22 that were assigned the sequence number N−1 that have not been transmitted yet to the remote storage system 226.

The remote storage system 226 receives the data from the chunk 54 corresponding to writes assigned a sequence number N−1 and constructs a new chunk 56 of host writes having sequence number N−1. The data may be transmitted using appropriate RDF protocol that acknowledges data sent across the link 29. When the remote storage system 226 has received all of the data from the chunk 54, the local storage system 224 sends a commit message to the remote storage system 226 to commit all the data assigned the N−1 sequence number corresponding to the chunk 56. Thus, sending the commit message by the R1 system to the R2 system indicates that all data of the cycle, such as cycle N−1, being transmitted has completed. Generally, once a chunk corresponding to a particular sequence number is committed, that chunk may be written to the logical storage device. This is illustrated in FIG. 4 with a chunk 58 corresponding to writes assigned sequence number N−2 (i.e., two before the current sequence number being used in connection with writes by the host 222 to the local storage system 26). In FIG. 4, the chunk 58 is shown as being written to a storage device 62 representing disk storage for the remote R2 device logically paired with R1 device 51 whereby processing is performed to replicate data of R1 device 51 on R2 device 62. Thus, the remote R2 storage system 226 is receiving and accumulating the chunk 56 corresponding to sequence number N−1 while the chunk 58 corresponding to the previous sequence number (N−2) is being written to disk storage 62 of the remote storage system 226. In some embodiments, the data for the chunk 58 is marked for write (but not necessarily written immediately to the physical storage medium or storage device), while the data for the chunk 56 is not (e.g. may be stored in cache or other memory buffer).

Thus, in operation, the host 22 writes data to the local storage system 224 that is stored locally in the R1 device 51 and is accumulated in the chunk 52. Once all of the data for a particular sequence number has been accumulated (described elsewhere herein), the local storage system 224 increments the sequence number. Data from the chunk 54 corresponding to one less than the current sequence number is transferred from the local storage system 224 to the remote storage system 226 via the link 29. The chunk 58 corresponds to data for a sequence number that was committed by the local storage system 224 sending a message to the remote storage system 226. Data from the chunk 58 is written to the R2 storage device 62.

Note that the writes within a particular one of the chunks 52, 54, 56, 58 are not necessarily ordered. However, as described in more detail elsewhere herein, every write for the chunk 58 corresponding to sequence number N−2 was begun prior to beginning any of the writes for the chunks 54, 56 corresponding to sequence number N−1. In addition, every write for the chunks 54, 56 corresponding to sequence number N−1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 4) and can be assured that the state of the data at the remote storage system 226 is ordered in the sense that the storage device 62 contains all of the writes that were begun prior to a certain point in time and contains no writes that were begun after that point in time. Thus, the R2 device, such as represented by element 62, always contains a point in time copy of R1 and it is possible to reestablish a consistent image from the R2 device.

In systems not using pre-transfer techniques herein as described in following paragraphs and with reference to FIG. 4, processing may be performed where the transmission of writes for cycle N does not begin until the following occurs: cycle N−1 finishes transferring data and such data is fully received at the R2 data storage system and also the R2 system has completed applying cycle N−2 writes to the R2 device. Thus, while capture is performed for writes of cycle N (e.g., element 52), the transmit phase (e.g., element 54) and receive phase (e.g., element 56) may be performed with respect to writes of cycle N−1 and the restore or apply phase (e.g., element 58) may be performed with respect to writes of cycle N−2. In such a system, the R1 system may send a commit message to the R2 system when R1 has completed transmitting all the cycle N−1 write data. The R2 system may send an acknowledgement regarding cycle N−1 to the R1 system when all the cycle N−1 write data has been received at R2 and when R2 has also completed applying write of cycle N−2 to the R2 device. In such a system not using pre-transfer techniques herein, the R1 data storage system 224 does not start sending data for cycle N until such acknowledgement for cycle N−1 has been received at the R1 system 224 from the R2 system 226. Once the acknowledgement for cycle N−1 is received, the R1 system may perform a cycle switch to cycle N and start sending writes for cycle N. During the time while the R1 system 224 is waiting to receive the acknowledgement for cycle N−1, the RDF link 29 may be underutilized since no data is currently being transmitted over link 29.

To further illustrate, consider the foregoing that illustrates processing as may be performing using asynchronous data replication techniques such as, for example, using the SRDF®/A product, without using the pre-transfer techniques herein with respect to writes directed to an R1 device of a primary or R1 data storage system where the R2 device is logically paired for data replication with an R2 device on the secondary or remote R2 data storage system.

Figure 5:
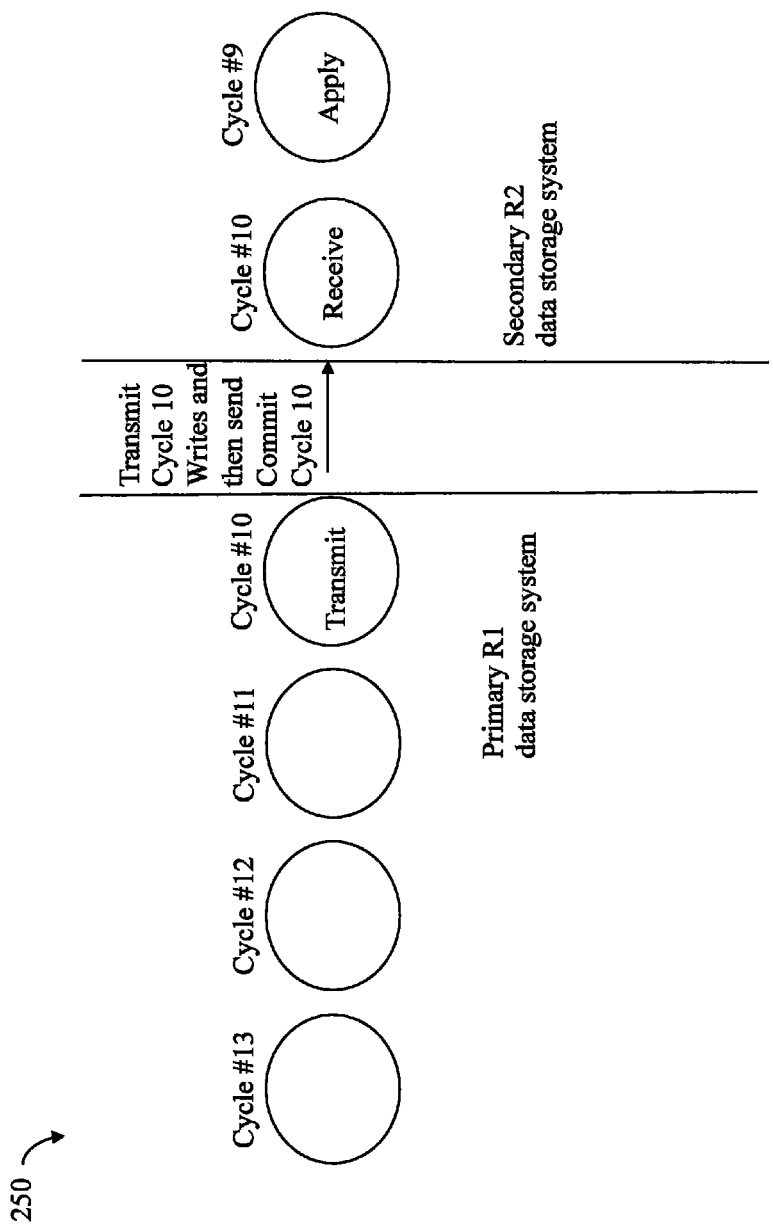
FIGS. 5-7 illustrate states of a system at different points in time in connection with a system not using pre-transfer techniques herein.

With reference to FIG. 5, shown is an example 250 in which the R1 primary data storage system may have collected data for cycles #10-13 (Currently collecting data for cycle 14 not shown), and cycle#10 (on primary R1 system) is in its transmit phase where R1 is in the process of transferring cycle #10 write data collected from the R1 to the R2 site. After cycle #10 data is transferred from R1 to R2, the R1 system sends a commit message to R2 to indicate that transfer of write data of cycle #10 is complete.

It should be noted that in connection with FIG. 5 and others herein, notation is used in which a circle with a cycle # denotes a cycle of writes collected for one instance of the defined time period, such as X seconds. For example, FIG. 5 illustrates that writes for cycle 10-13 have been collected on the R1 system, that cycle 10 is transmitted and then a commit message is sent subsequent to completing the transfer of cycle 10 writes, that cycle 10 writes are currently being received on the R2 system, and the cycle 9 writes are being applied to the R2 device.

At this first point in time, the current cycle state may be represented as illustrated in FIG. 5 where there is no data transmission of cycle write data such as over the RDF link between the R1 and R2 systems after the cycle 10 commit message is sent. In this case, R1 has completed the transmit phase for cycle #10, R2 has received all cycle #10 writes and R2 is currently applying cycle #9 writes locally to the R2 device.

Figure 6:
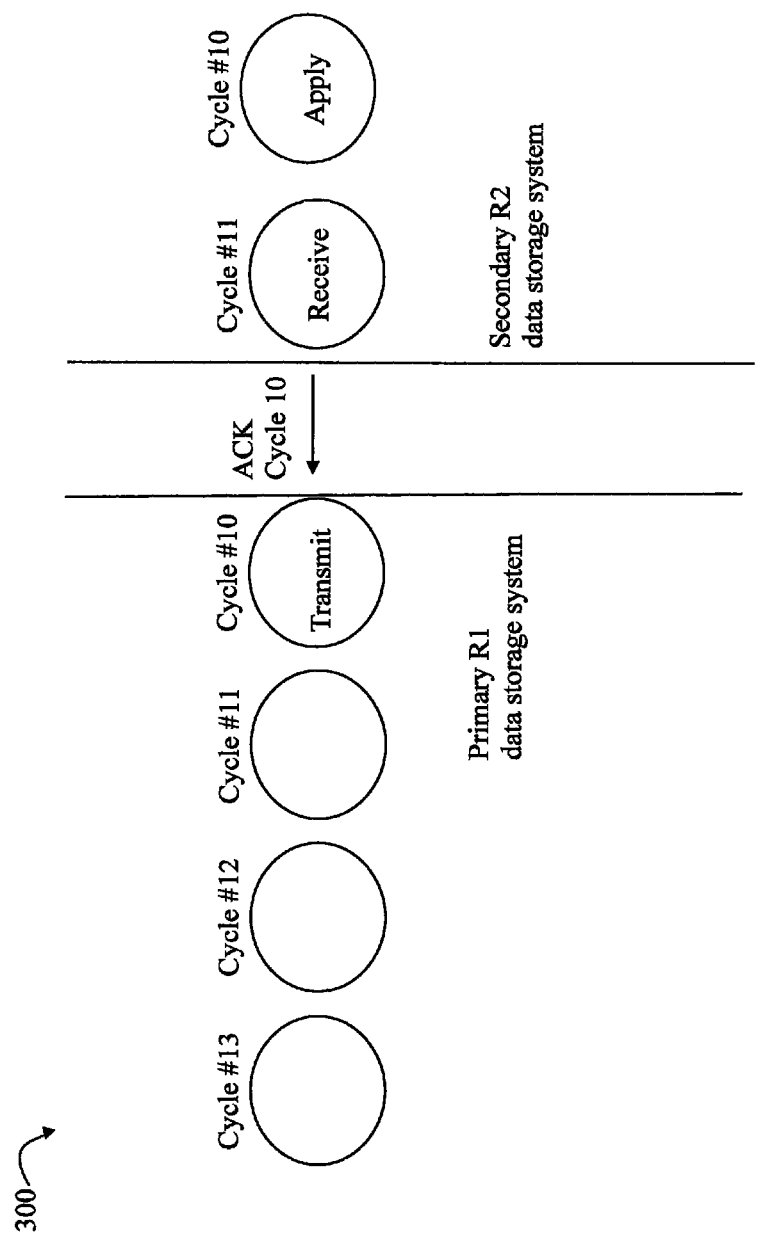

As illustrated in FIG. 6, once the secondary R2 system is done applying cycle #9 writes to the R2 device, R2 commences applying the cycle #10 data and the R2 system updates its current cycle state for expected awaiting data transmission to cycle #11. Once the R2 system is done applying cycle #9 data to the R2 device and has received all cycle #10 data, R2 also sends an acknowledgement regarding cycle #10 to the primary R1 system and, as then further illustrated in FIG. 7, the R1 system responds by permitting the cycle transmission switch on the R1 system to the next cycle #11.

In an embodiment not using pre-transfer techniques herein, until the R1 system receives the acknowledgement regarding cycle #10 from the R2 system indicating that cycle #10 data has been received and also indicating that cycle #9 data has been applied to the R2 device, the R1 system remains in cycle #10 transmission phase (e.g., switch to cycle #11 for transmission is pending) as shown in the example 300 of FIG. 6.

Only after primary R1 system receives the acknowledgement for cycle #10 (e.g., regarding cycle #9 data being applied to the R2 device and regarding all the cycle #10 data being received at R2) does R1 switch to cycle #11 for transmission and commence sending cycle #11 writes. After the R1 system updates its state and performs a cycle switch to cycle #11, the cycle state may be illustrated as in the example 350 of FIG. 7.

Figure 7:
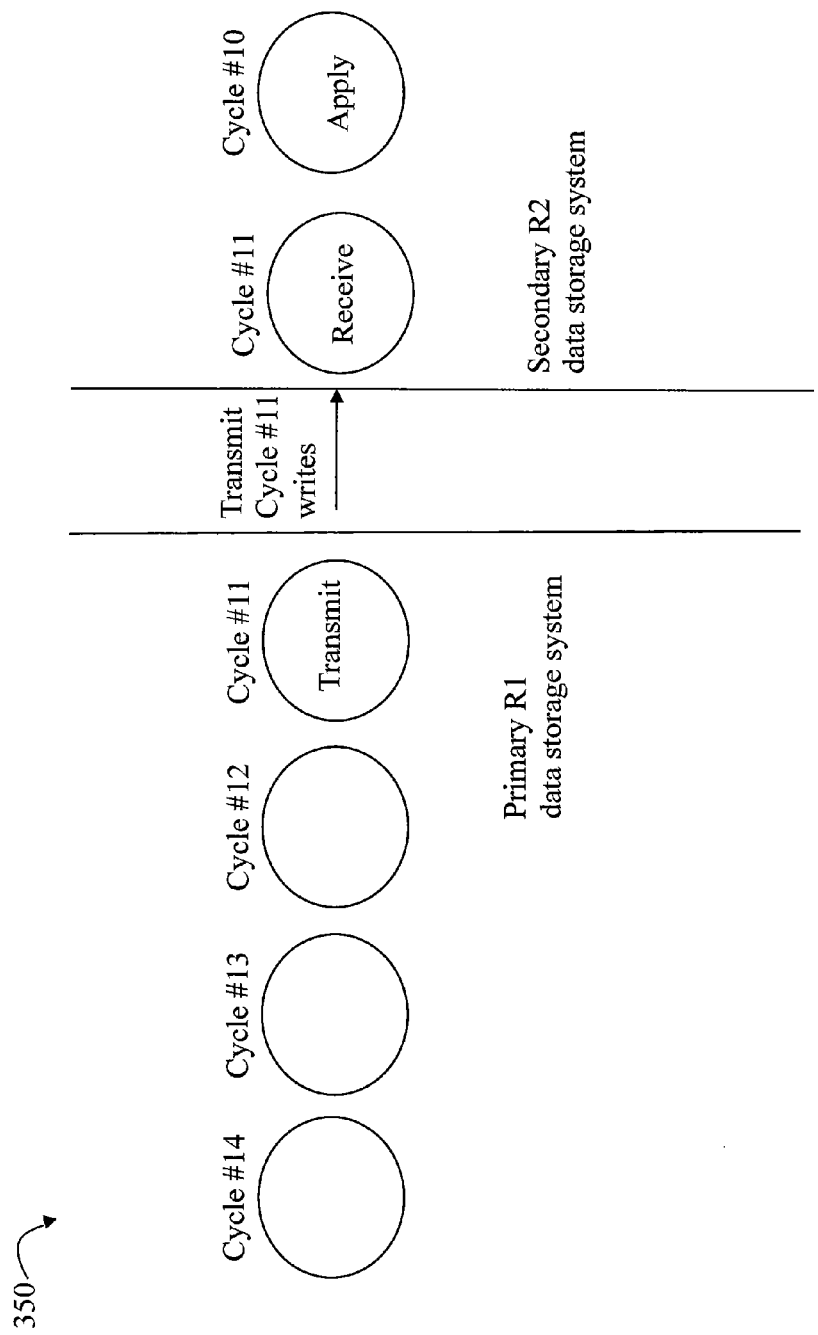

In connection with the foregoing of systems without using the pre-transfer techniques herein, the primary R1 system does not send data from the next transmit phase of cycle #11 until it receives such acknowledgement from the R2 system that cycle #9 writes have been applied to the R2 device and that cycle #10 data has been completely received. During the time illustrated above while R1 waits for the acknowledgement from the R2 system regarding cycle #10 (e.g., such as in connection with illustration #1 and #2), no write data collected for cycle #11 in connection with data replication is transmitted from the primary R1 system to secondary R2 system and the network between R1 and R2 systems may be underutilized, for example, while waiting for cycle #9 data to be applied to the R2 device. Thus, while replication is in states as illustrated by FIGS. 5 and 6, the R1 data storage system may not send any data for new subsequent cycles (e.g., cycle #11) until the cycle transmission switch on R1 to the new cycle 11 as illustrated in FIG. 7.

As an improvement, an embodiment in accordance with techniques herein may perform an enhancement, also referred to herein as the pre-transfer technique, that enables the transfer of data from *future* transmit cycles (e.g., such as cycle #11) as soon as the *current* transmit cycle data (e.g., such as from cycle #10) has been transmitted by R1. Thus, in an embodiment in accordance with techniques herein, the R1 system may commence transmitting writes for cycle #11 as soon as it has completed transferring writes and sending the commit message for cycle #10 (e.g., without waiting for acknowledgement from the R2 system thereby indicating that cycle #10 writes have been received and cycle #9 writes have been applied to the R2 device).

The foregoing may be performed to improve network utilization such as for the network connecting R1 and R2 systems. With this improvement, R1 may start transmitting writes for cycle#11 at the point in time illustrated in connection with FIG. 5 rather than at the subsequent point in time as illustrated by FIG. 7 so that, for example, by the time cycle switch to cycle #11 occurs on R1 as illustrated in FIG. 7, the secondary R2 site may have already having received a large portion of the cycle #11 transmitted data.

What will now be described is a more detailed example illustrating performing asynchronous replication in an embodiment in accordance with pre-transfer techniques herein. Such techniques may be performed using components of a system such as described in connection with FIG. 4 as noted above.

Figure 8:
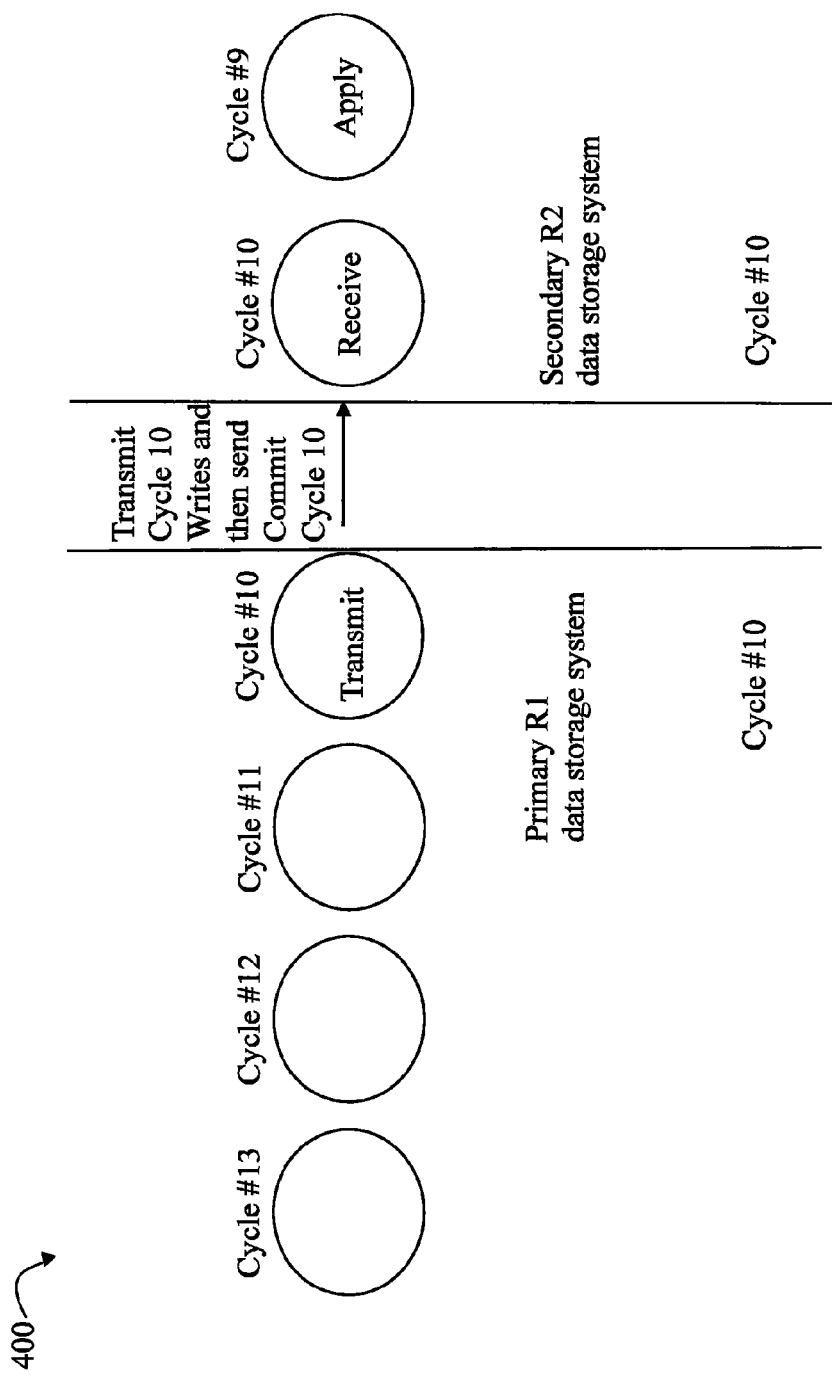
FIGS. 8-14 illustrate states of a system at different points in time in connection with an embodiment of a system using pre-transfer techniques herein.

Referring to FIG. 8, shown is an example representing the state of the system at a first point in time. The example of FIG. 8 may represent a state of the system at a first point in time such as described above in connection with FIG. 5. In the example 400, the R1 system has completed transmitting cycle 10 writes and sends a commit message regarding cycle 10 indicating that the R1 system has completed sending cycle 10 writes.

In the example 400, both the R1 and R2 systems having a current cycle or sequence number of 10. The current cycle of 10 on the R1 system indicates that the R1 system has not yet received an acknowledgement (ACK) regarding cycle 10 from the R2 system whereby such ACK regarding cycle 10 indicates that the R2 system has received all of cycle 10 writes from R1 and that R2 has also completed applying cycle 9 writes to the R2 device. The current cycle of 10 on the R2 system indicates that R2 has not yet sent the cycle 10 ACK to the R1 system.

In an embodiment in accordance with techniques herein, the R1 system may commence sending writes of cycle 11 immediately following completion of transmitting cycle 10 data and commit. As described elsewhere herein, the R1 system commences transmitting cycle 11 writes without waiting for the ACK regarding cycle 10 from the R2 system.

Figure 9:
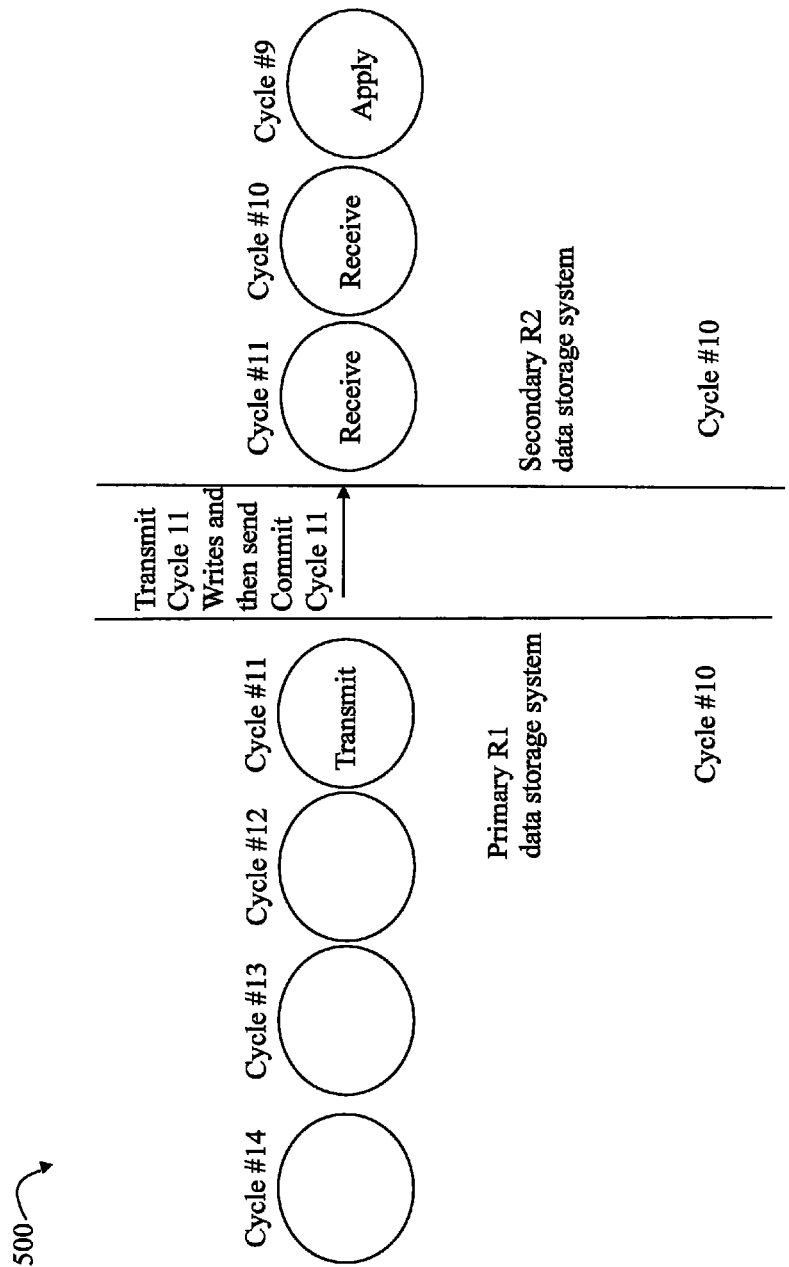

Referring to FIG. 9, shown is an example representing the state of the system at a second point in time subsequent to that of FIG. 8. In the example 500, the R2 system is still applying cycle 9 writes to the R2 device. The R1 system has transmitted cycle 11 writes, and then also transmitted a commit message regarding cycle 11 indicating that the R1 system has completed sending cycle 11 writes. Thus, the example 500 illustrates use of pre-transfer techniques herein for the pre-transfer of cycle 11 writes whereby the cycle number on the system R1 is 10 since the ACK regarding cycle 10 has not yet been received from the R2 system. FIG. 9 illustrates an example of a scenario where the current pre-transfer state is 1 cycle since the R1 system has a current cycle number of 10 and the current cycle of write data transmitted is 11.

In an embodiment in accordance with techniques herein, the R1 system may commence sending writes of cycle 12 immediately following completion of transmitting cycle 11 data and commit. As described elsewhere herein, the R1 system commences transmitting cycle 12 writes without waiting for the ACK regarding cycle 11 from the R2 system.

FIG. 9 illustrates that writes for cycles 11-14 have been collected on the R1 system (cycle 15 collection in progress but not illustrated), that cycle 11 writes are transmitted and then a commit message is sent subsequent to completing the transfer of cycle 11 writes, that cycle 10 and 11 writes have been received on the R2 system, and the cycle 9 writes are being applied to the R2 device.

Figure 10:
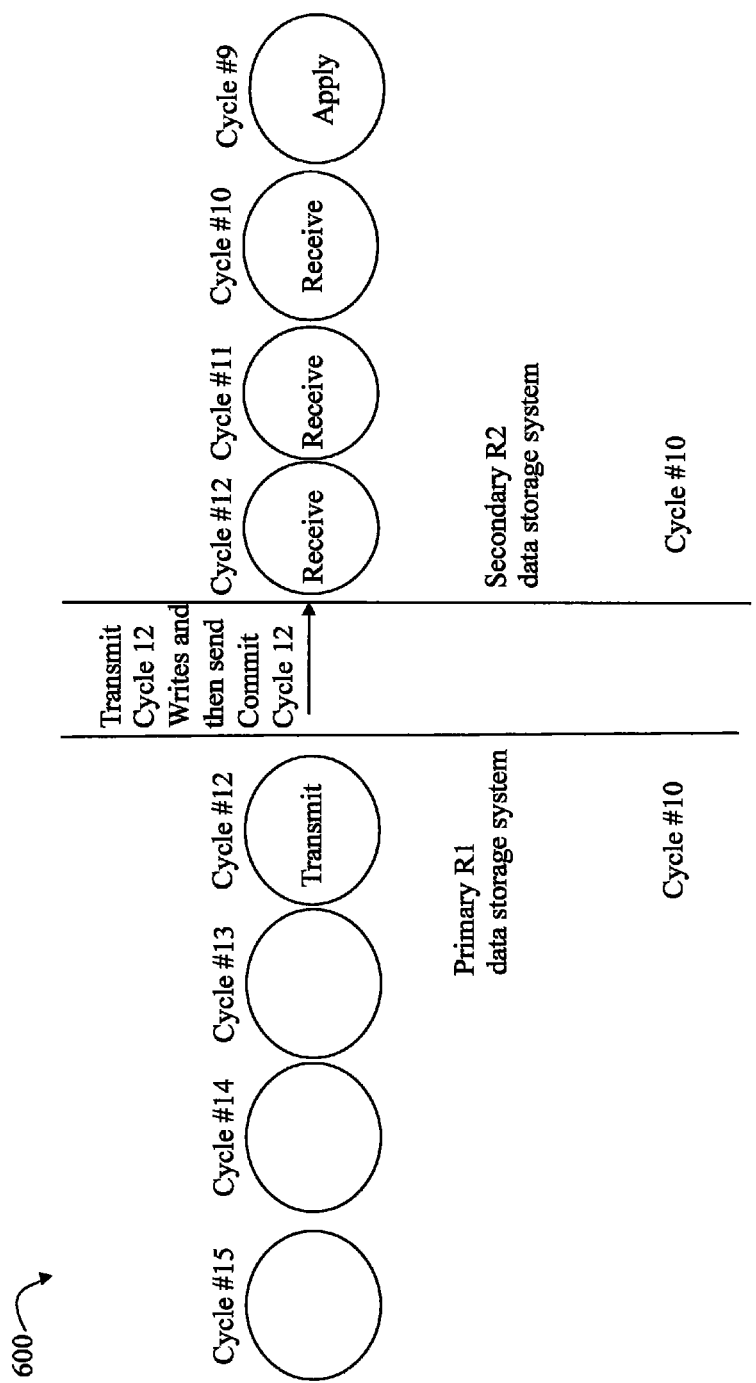

At a third point in time subsequent to that illustrated in FIG. 9, the R1 system commences transmission of cycle 12 writes as illustrated in FIG. 10 while the R2 system is still applying cycle 9 writes to the R2 device. Subsequent to completing the transfer of cycle 12 writes, the R1 system sends a commit message regarding cycle 12 indicating completion of transmission of cycle 12 writes.

The example 600 illustrates the pre-transfer of cycle 12 writes whereby the cycle number on the system R1 is 10 since the ACK regarding cycle 10 has not yet been received from the R2 system. FIG. 10 illustrates an example of a scenario where the current pre-transfer state is 2 cycles since the R1 system has a current cycle number of 10 and the current cycle of write data transmitted is 12.

FIG. 10 illustrates that writes for cycles 12-15 have been collected on the R1 system (cycle 16 collection in progress but not illustrated), that cycle 12 writes are transmitted and then a commit message is sent subsequent to completing the transfer of cycle 12 writes, that cycle 10, 11 and 12 writes have been received on the R2 system, and the cycle 9 writes are being applied to the R2 device.

Figure 11:
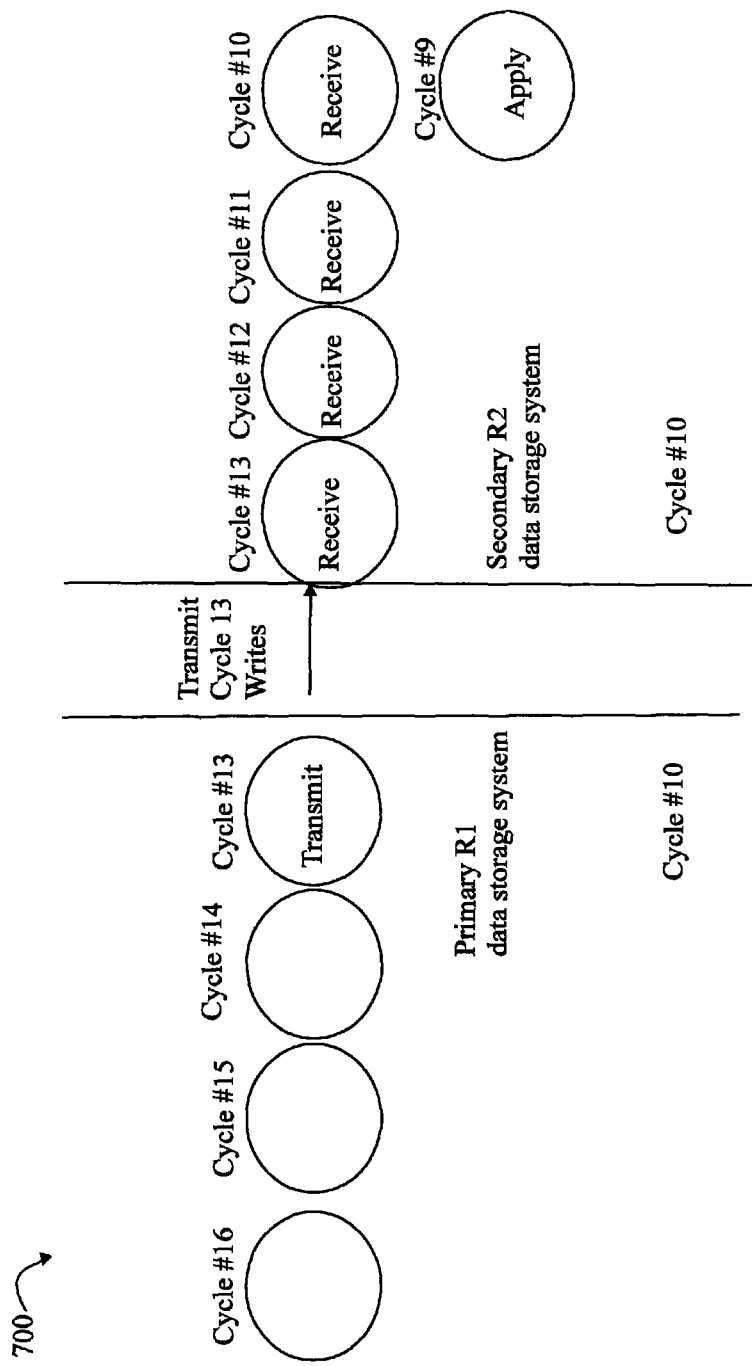

At a fourth point in time subsequent to that illustrated in FIG. 10, the R1 system commences transmission of cycle 13 writes as illustrated in FIG. 11 while the R2 system is still applying cycle 9 writes to the R2 device. The example 700 illustrates the pre-transfer of cycle 13 writes whereby the cycle number on the system R1 is 10 since the ACK regarding cycle 10 has not yet been received from the R2 system. FIG. 11 illustrates an example of a scenario where the current pre-transfer state is 3 cycles since the R1 system has a current cycle number of 10 and the current cycle of write data transmitted is 13.

FIG. 11 illustrates that writes for cycles 13-16 have been collected on the R1 system (cycle 17 collection in progress but not illustrated), that cycle 13 writes are being transmitted, that cycle 10, 11, 12 and 13 writes have been received on the R2 system, and the cycle 9 writes are being applied to the R2 device.

Figure 12:
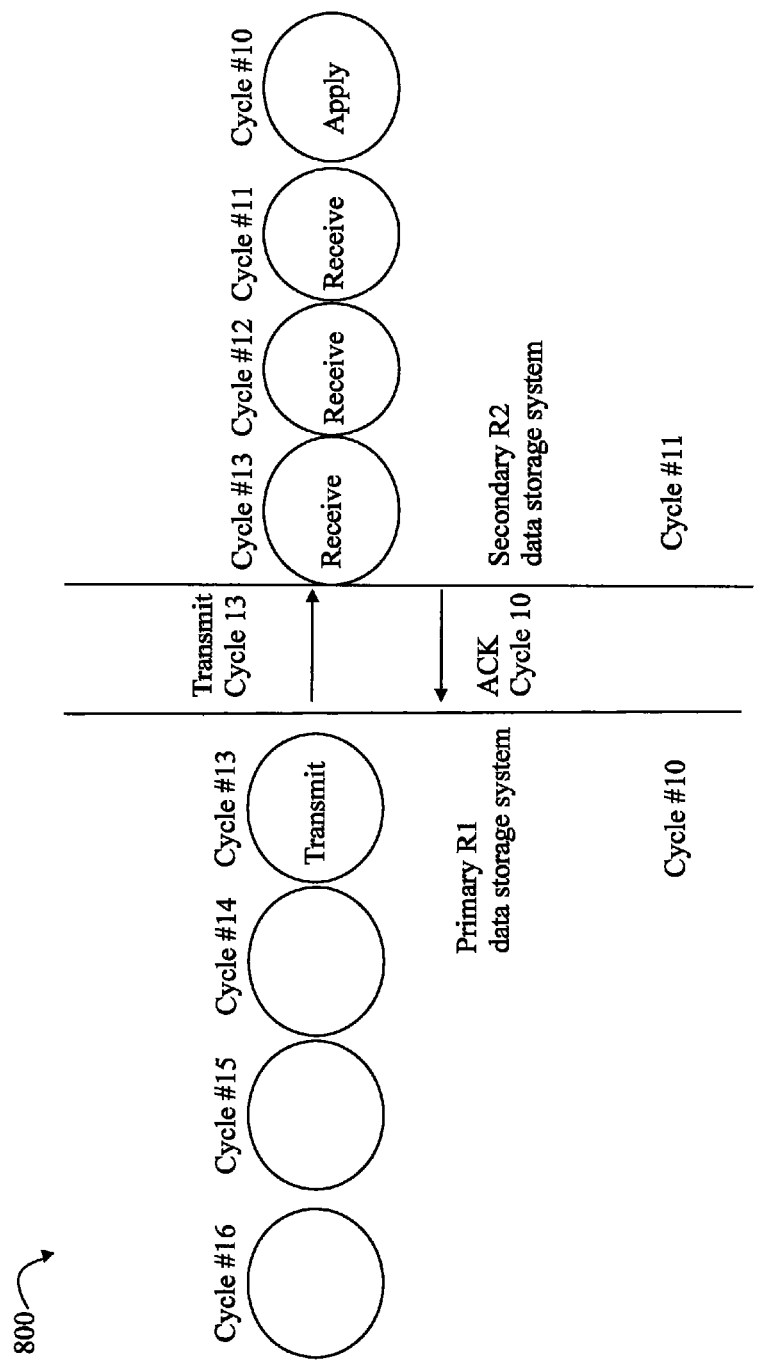

Referring to FIG. 12, shown is an example 800 illustrating a state of the system at a fifth point in time subsequent to that illustrated in FIG. 11. In the example 800, the R1 system is transmitting cycle 13 writes and the R2 system has completed applying cycle 9 writes to the R2 device of the R2 system. Additionally, all of cycle 10 writes have been received on the R2 system so that the R2 system sends an ACK regarding cycle 10 to the R1 system. The R2 system further commences applying cycle 10 writes to the R2 device and increments its current cycle to 11.

FIG. 12 illustrates that writes for cycles 13-16 have been collected on the R1 system (cycle 17 collection in progress but not illustrated), that cycle 13 writes are being transmitted, that cycle 11, 12 and 13 writes have been received on the R2 system, and the cycle 10 writes are being applied to the R2 device.

Figure 13:
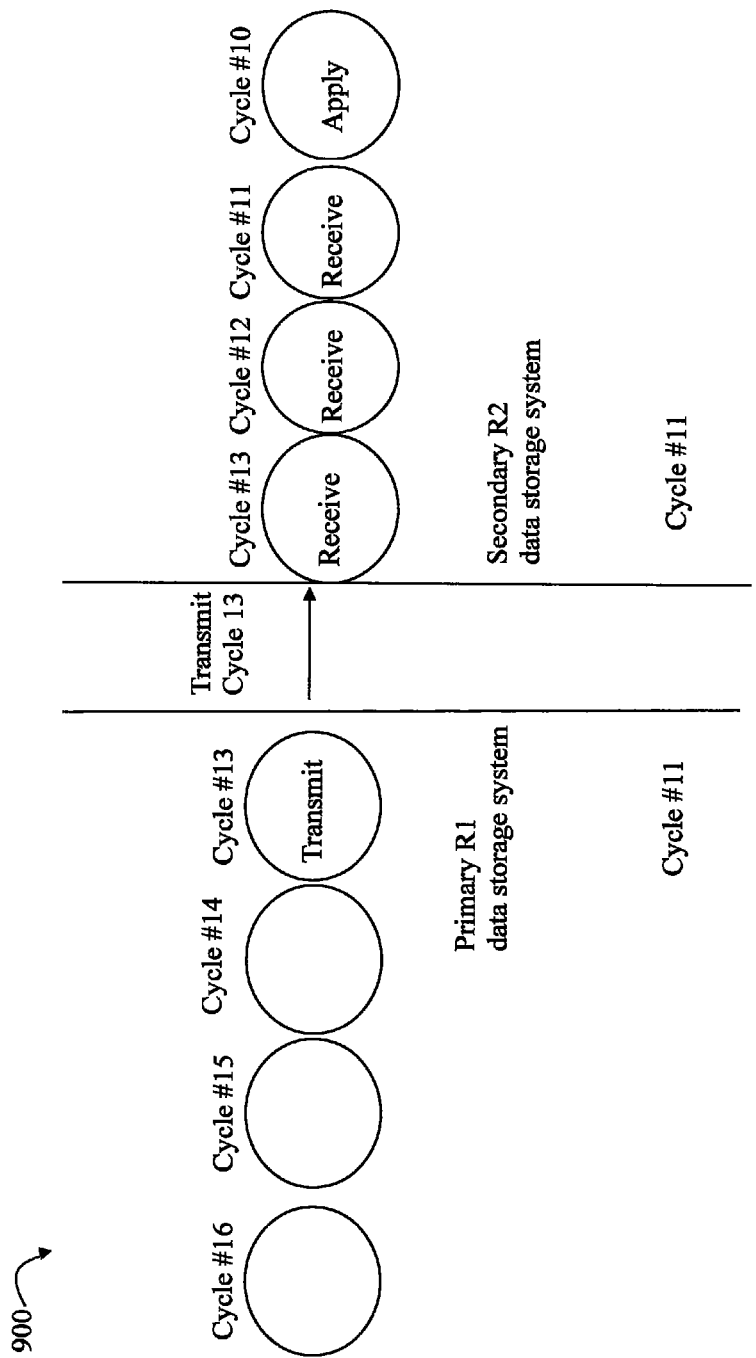

Referring to FIG. 13, shown is an example 900 illustrating a state of the system at a sixth point in time subsequent to that illustrated in FIG. 12. In the example 900, the R1 system receives the ACK regarding cycle 10 and increases its current cycle number to 11. The R2 system is still applying cycle 10 writes to the R2 device.

The example 900 illustrates the pre-transfer of cycle 13 writes whereby the cycle number on the system R1 is 11 since the ACK regarding cycle 11 has not yet been received from the R2 system. FIG. 13 illustrates an example of a scenario where the current pre-transfer state is 2 cycles since the R1 system has a current cycle number of 11 and the current cycle of write data transmitted is 13.

Figure 14:
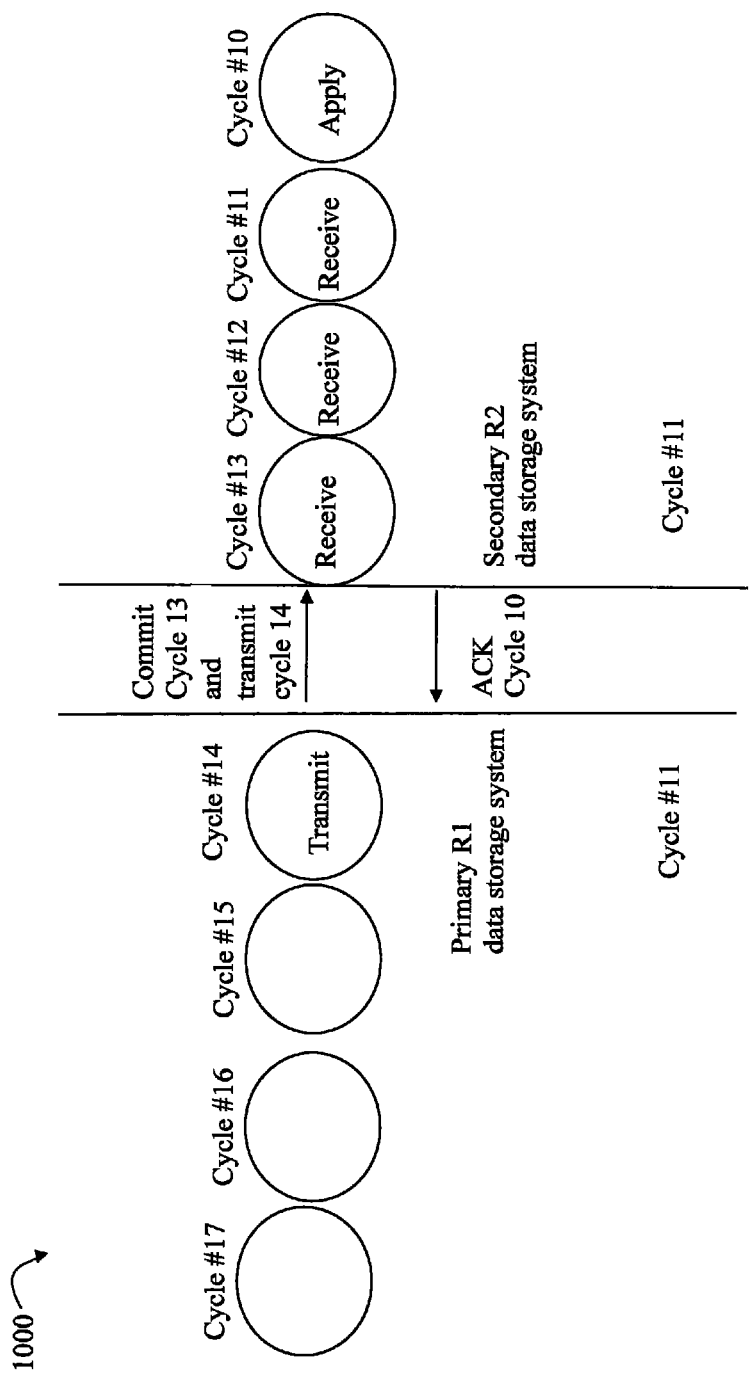

Referring to FIG. 14, shown is an example 1000 illustrating a state of the system at a seventh point in time subsequent to that illustrated in FIG. 13. In the example 1000, the R1 system sends a commit message regarding cycle 13 since it has completed sending cycle 13 writes and commences sending cycle 14 writes. The R2 system is still applying cycle 10 writes to the R2 device.

The example 1000 illustrates the pre-transfer of cycle 14 writes whereby the cycle number on the system R1 is 11 since the ACK regarding cycle 11 has not yet been received from the R2 system. FIG. 14 illustrates an example of a scenario where the current pre-transfer state is 3 cycles since the R1 system has a current cycle number of 11 and the current cycle of write data transmitted is 14.

FIG. 14 illustrates that writes for cycles 14-17 have been collected on the R1 system (cycle 18 collection in progress but not illustrated), that a commit message is sent subsequent to completing the transfer of cycle 13 writes, that cycle 14 writes are currently being transmitted, that cycle 11, 12 and 13 writes have been received on the R2 system, and the cycle 10 writes are being applied to the R2 device.

The foregoing FIGS. 8-14 illustrate examples of the state of the system at various points in time operating in accordance with techniques described herein which provide for pre-transfer of cycle data from the R1 to the R2 system.

In an embodiment in accordance with techniques herein, there may be multiple cycles of write data for which the R2 system has received less than the complete cycle of writes. For example with reference to FIG. 11, the R1 system may be currently transmitting cycle 13 writes and may have completed sending writes for cycles 11 and 12. However, the R2 system may not have received all writes for cycles 11, 12 and 13. Transmission of such write data for any one or more of cycles 11, 12 and 13 may not have been completely received by the R1 system. In other words, the write data for any cycle, once sent from the R1 system, may arrive at the R2 system in any order. However, the R2 system applies the cycles of write data in sequence in accordance with the associate cycle or sequence number. For example, cycle N+1 write data is applied after cycle N write data has been completely applied. The R2 system does not apply any write data from cycle N+1 until all write data from cycle N has been received and applied to the R2 device.

In connection with the foregoing, write data that is transferred from the R1 system to the R2 system may include an associated cycle number ID or tag identifying the particular cycle to which the write data belongs. In this manner, the R2 system may receive the write data for multiple cycles in any order and then use the cycle number ID or tag included in the received write data message to determine the correct cycle to which the received write data belongs.

It should be noted that the end of cycle commit state or operation (denoting that R1 has completed sending a particular cycle of writes) may generally include sending and/or exchanging one or more messages between the R1 and the R2 systems. In one embodiment, the metadata included in a message denoting the commit state regarding a particular cycle N may include sufficient information for the R2 system to be able to determine when it has received all the cycle N write data. For example, such metadata may denote one or more characteristics about the entire cycle N write data such as the total number of writes in the cycle N, the total amount or size of write data in the cycle, and the like. To further illustrate, the R1 system may have completed transmission of cycle N which includes only 10 writes and then the R1 system sends commit message for cycle N indicating that R1 has completed transmission of cycle N writes which includes 10 writes. The R1 system may commence sending cycle N+1 write data. The R2 system may have received 8 writes of cycle N and a portion of writes of cycle N+1. Additionally, the R2 system may also have received the cycle N commit message from the R1 system indicating that cycle N includes 10 writes. However, the R2 system has not yet received the remaining 2 writes of cycle N. In this manner, the R2 system may determine that it has not received all the cycle N writes.

In one embodiment, the techniques herein may be applied on a continuous basis without limiting the number of transfer cycles of data which are pre-transferred ahead of the current cycle number switching. Thus, as described herein, cycle number switching indicates that a particular cycle X of data has been received by R2 and that cycle X−1 data has been completely applied to the R2 data set. In this manner, applying techniques herein on a continuous basis means that there is no limit to the difference between the transmit cycle number of data being transmitted from R1 to R2 and the current cycle number. Such transmission of cycle data may be performed in a continuous manner such that once cycle N's data has been transmitted from R1 to R2, R1 may commence transmitting cycle N+1's data. In such a case, the cycle for which data is being transmitted by R1 is not restricted or limited by the current cycle number whose data is being applied to the R2 data set.

Alternatively, an embodiment may specify a limit of the number of cycles of data that are pre-transferred to R2. The limit may specify a maximum allowable difference or distance between the transmit cycle number of data currently being transmitted from R1 to R2 and the current cycle number. This limit affects how far ahead the transmit cycle is with respect to the current cycle number and limits the number of cycles of data that are required to be buffered on R2 whereby such buffered cycles of data have not yet been applied to the R2 data set and have been either partially or wholly received by R2. In this case, the pre-transfer limit may be set in one aspect to limit the number of pending cycles for which cycle data has been received by the R2 system that has not yet been applied to the R2 device.

Such a limit on the maximum allowable number of cycles for which pre-transfer of cycle data form R1 to R2 is performed may be based on resources available on the R1 and/or R2 systems such as to buffer and store write data collected on R1, data received and waiting to be applied to the R2 device, and the like.

For example, reference is made back to FIGS. 5-7 where there is no pre-transfer of cycle data and thus the pre-transfer limit is 0. In the example illustrated in FIGS. 5-7, the R1 system does not begin transmitting cycle 11 data until the R1 system has updated its cycle number to 11 (e.g., performed a cycle switch from 10 to 11) upon receiving the ACK regarding cycle 10 from the R2 system.

In connection with an embodiment in accordance with techniques herein, reference is made back to FIG. 9 where the current pre-transfer state illustrated is 1 since cycle 11 writes are being transmitted while the current cycle on the R1 system is 10. Assume that a pre-transfer limit of 1 is specified. In this case, the R1 system would not commence transmitting the cycle 12 data as in FIG. 10 since this would advance the current pre-transfer state to +2 and the pre-transfer limit is 1. Rather, the R1 system would wait until it receives the ACK regarding cycle 10 prior to commencing transmission of cycle 12 writes.

As a further illustration with a pre-transfer limit, assume that a pre-transfer limit of 3 is specified. In this case, processing may proceed as described and illustrated in connection with FIGS. 8-14 since the pre-transfer state does not exceed the limit of 3. For example, in connection with FIGS. 11 and 14, a pre-transfer of cycle data occurs for 3 cycles but does not exceed the pre-transfer limit of 3.

As with the general data storage system described elsewhere herein, a write operation may be processed by initially storing the write data in cache of the data storage system and marking the corresponding cache location as including write pending data. At a later point in time, the write data in the cache marked as write pending is destaged to physical storage whereby the write data is copied from cache to physical storage. On the R1 system, the write operation may be considered completed once the write data directed to the R1 device is stored in cache on the R1 system. In a similar manner, a write operation may be considered applied to an R2 device when the write data of the write operation is any of stored as write pending data in a cache of the second data storage system, and destaged to a location on a physical storage device provisioned for the R2 device.

Although techniques are described herein with respect to a single R1 device and a single R2 device, it should be noted that more generally, techniques herein may be applied to a group of R1 devices and group of R2 devices. For example, a cycle of data may be collected for a time period with respect to a group of R1 devices and techniques herein may be applied with respect to the group of R1 devices and group of R2 devices. Each device in the R1 group may be logically paired with a particular device in the R2 group for purposes of data replication. In this case, the logical relationship between a first device of the R1 group and a second device of the R2 group is that the techniques herein are used to perform continuous replication of the first device on the second device.

In such an embodiment where consistency is desired with respect to the entire group of R2 devices, techniques herein may be generally applied with respect to the entire group of R2 devices. For example, additional processing may be performed on the R2 system to track when all the write data for a particular cycle has been received for all R2 devices of the R2 group, track when a particular cycle of writes for all R2 devices of the R2 group have been applied, and the like. Such tracking may be used to coordinate when to commence applying a next cycle of writes to R2 devices of the R2 group. In a manner similar to that as described herein with respect to a single R1-R2 device pairing, write data of cycle N is not applied to any R2 device in the R2 group until all write data of cycle N-1 has been applied to all R2 devices in the R2 group. Such processing may also not apply the write data of cycle N to any R2 device of the R2 group until all cycle N write data for all R2 devices of the R2 group has been received by the R2 system. In such a manner, all write data of each cycle may be applied, or not, as a unit to all R2 device of the R2 group. Since consistency is maintained between cycles, if replication stops, processing is performed to ensure that either a fully received cycle of write data is applied to all R2 device in the R2 group, or is otherwise not applied to any R2 device of the R2 group.

In such an embodiment, the transmission of data for each R1-R2 device pairing may proceed as described elsewhere herein with the additional processing for tracking and coordinating when to commence applying a next cycle of writes to the R2 device group.

Figure 15:
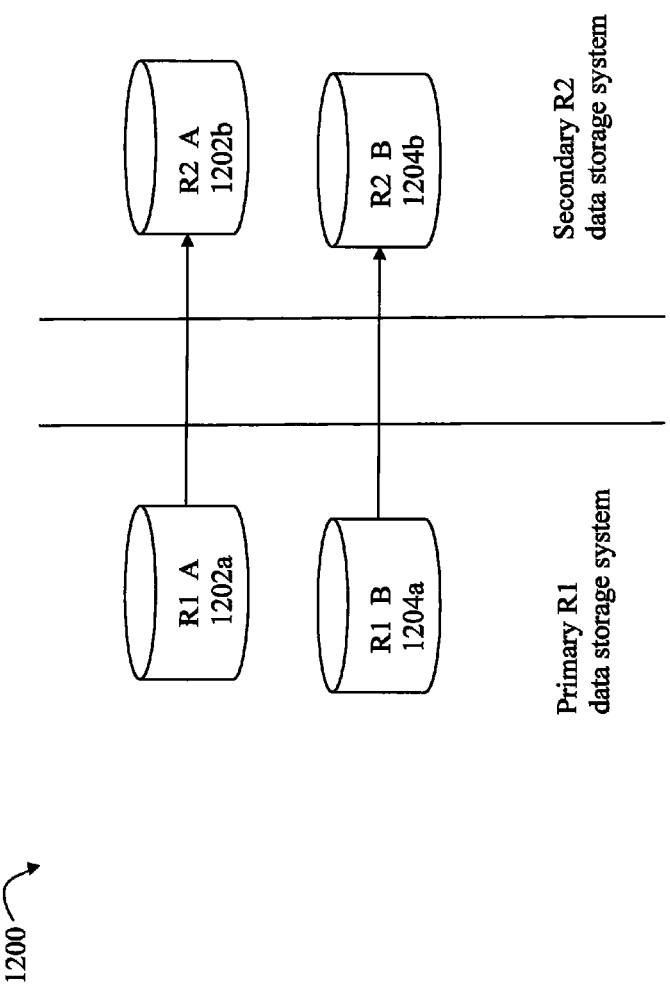
FIG. 15 illustrates an R1 device group and an R2 device group that may be used in an embodiment in accordance with techniques herein.

Referring to FIG. 15, shown is an example illustrating and R1 device group and an R2 device group that may be used in an embodiment in accordance with techniques herein. The example 1200 illustrates an R1 device group including device R1 A 1202*a* and R1 B 1204*a*, and illustrates an R2 device group include device R2 A 1202*b* and R2 B 1204*b*. A first logical device pairing is defined as R1 A 1202*a* and R2 A 1202*b* whereby techniques as described herein may be performed to replicate data of device R1 A 1202*a* on device R2 A 1202*b*. A second logical device pairing is defined as R1 B 1204*a* and R2 B 1204*b* whereby techniques as described herein may be performed to replicate data of device R1 B 1204*a* on device R2 B 1204*b*. Processing as described herein may be performed to ensure write consistency among all devices R2 A 1202*b*, R2 B 1204*b* of the R2 device group whereby all such devices of the group have write applied up to the same cycle number.

Figure 16:
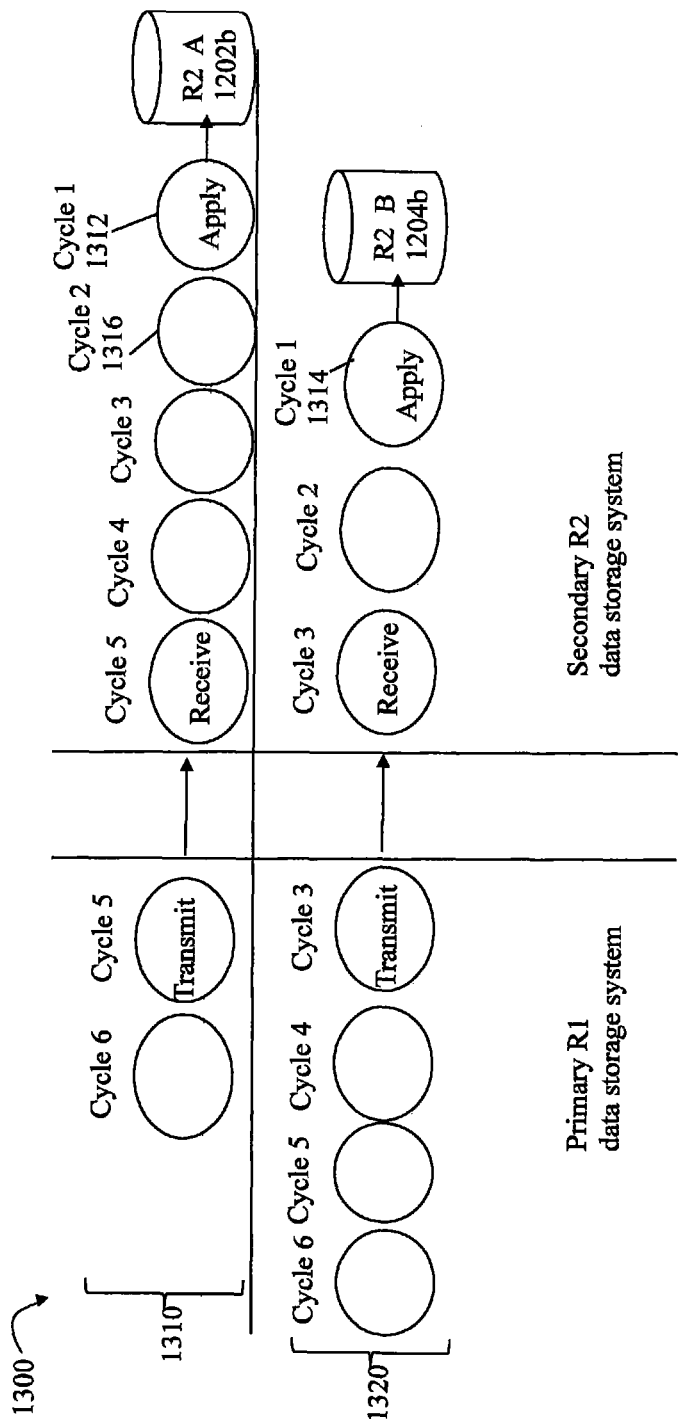
FIG. 16 illustrates a state of replication processing in an embodiment in accordance with techniques herein.

To further illustrate, reference is made to the example 1300 of FIG. 16. Element 1310 may represent the current state of replication processing for the first logical device pair R1 A 1202*a* and R2 A 1202*b* (as illustrated in FIG. 15) and element 1320 may represent the current state of replication processing for the second logical device pair R1 B 1204*a* and R2 B 1204*b* (as illustrated in FIG. 15). In one embodiment, transmission of cycle data may proceed as described herein independently for each logical device pair.

Element 1310 indicates that for the first logical device pair, cycle 5 and cycle 6 writes have been collected on the R1 system, cycle 5 writes are currently being transmitted from the R1 to the R2 system, writes for cycles 2, 3, and 4 have been completely received on the R2 system, and cycle 1 writes are currently being applied to R2 A 1202*b*.

Element 1320 indicates that for the second logical device pair, writes for cycles 3, 4 and 5 have been collected on the R1 system, cycle 3 writes are currently being transmitted from the R1 to the R2 system, writes for cycle 2 has been completely received on the R2 system, and cycle 1 writes are currently being applied to R2 B 1204*b*. In this example, the cycle 1 writes 1312 as applied to R2 A 1202*b* may be completed and the cycle 1 writes 1314 as applied to R2 B 1204*b* may still be in progress. Thus, although the R2 system could begin applying cycle 2 writes 1316 to R2 A 1202*b* since the application of cycle 1 writes 1312 thereto has completed, such cycle 2 writes 1316 may not be applied in the illustrated embodiment in accordance with techniques herein until application of all cycle 1 writes 1314 to R2 B 1204*b* has also completed. In other words, all cycle 1 writes are applied to both R2 devices 1202*b*, 1204 prior to applying any write of cycle 2 to any R2 device 1202*b* 1204*b*.

Figure 17:
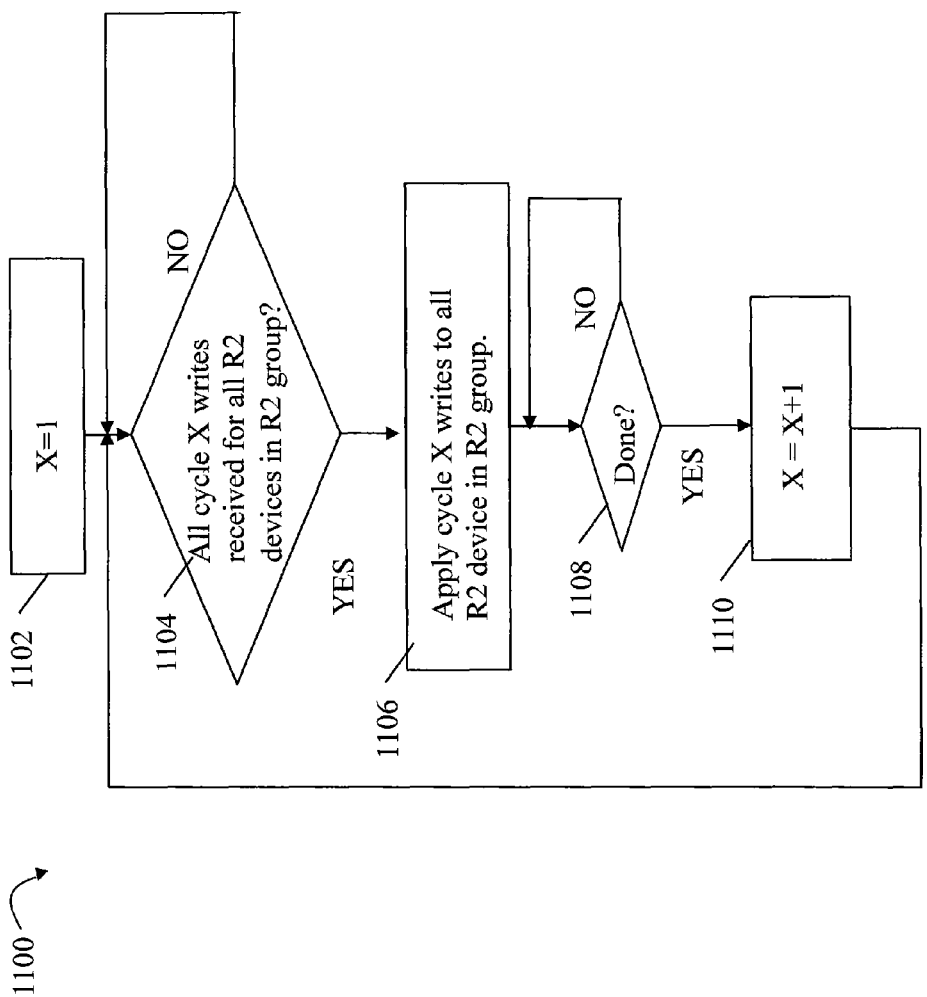
FIGS. 17, 24 and 25 are flowcharts of processing steps that may be performed in an embodiment in accordance with techniques herein.

Referring to FIG. 17, shown is a flowchart of processing steps that may be performed in an embodiment in accordance with techniques herein with an R1 group of R1 devices and an R2 group of R2 devices as described above. The flowchart 1100 may be used to provide data consistency among the R2 group of R2 devices. At step 1102, X may be assigned a value of 1 denoting the first cycle of writes. X is a processing variable denoting that current cycle of writes for which processing is being performed to apply to the R2 group of R2 devices. At step 1104, a determination is made as to whether all cycle X writes have been received at the R2 system for al R2 devices in the R2 device group. It should be noted that a determination may be made that a particular cycle of writes has been received by the R2 system when the R2 system receives the commit message for that particular cycle from the R1 system as described elsewhere herein.

Control remains at step 1104 until step 1104 evaluates to yes and then processing proceeds to step 1106. In step 1106, the cycle X writes are applied to all R2 device in the R2 group. At step 1108, a determination is made as to whether all cycle X writes have been applied. Control remains at step 1108 until step 1108 evaluates to yes and then processing proceeds to step 1110 where X is incremented by 1 to identify the next cycle of writes to be processed. From step 1110, control returns to step 1104.

It should be noted more generally, such techniques described herein may be performed to ensure data consistency among a single R2 device group including more than two R2 devices, and may be performed to ensure data consistency among multiple R2 device groups.

Described above are pre-transfer techniques that may be performed in an embodiment of a data storage system supporting operation in a pre-transfer mode. Additionally, as mentioned above in connection with the R1 system, an embodiment may operate in a multiple cycle mode that allows more than two cycles of write data to be collected on R1 by collecting a cycle of data at each occurrence of a fixed interval. For example, an embodiment may collect a set of write data for a cycle, for example, every X seconds independent of the rate at which the data is being transferred and independent of how many cycles are currently backlogged on the R1 side and/or R2 side. For example, with reference back to FIG. 8, each of the cycles 10-13 of write data captured on the R1 system may be denote a set of writes captured during an occurrence of a fixed time period, such as, for example, every 30 seconds. One advantage of using smaller cycle times is that the amount of data transferred for a single cycle is much smaller and quicker to transfer than using larger and/or varying cycle times. Additionally, the R2 system device is more up to date using such smaller cycles providing an advantage, for example, if the R1 system device fails.

Figure 18:
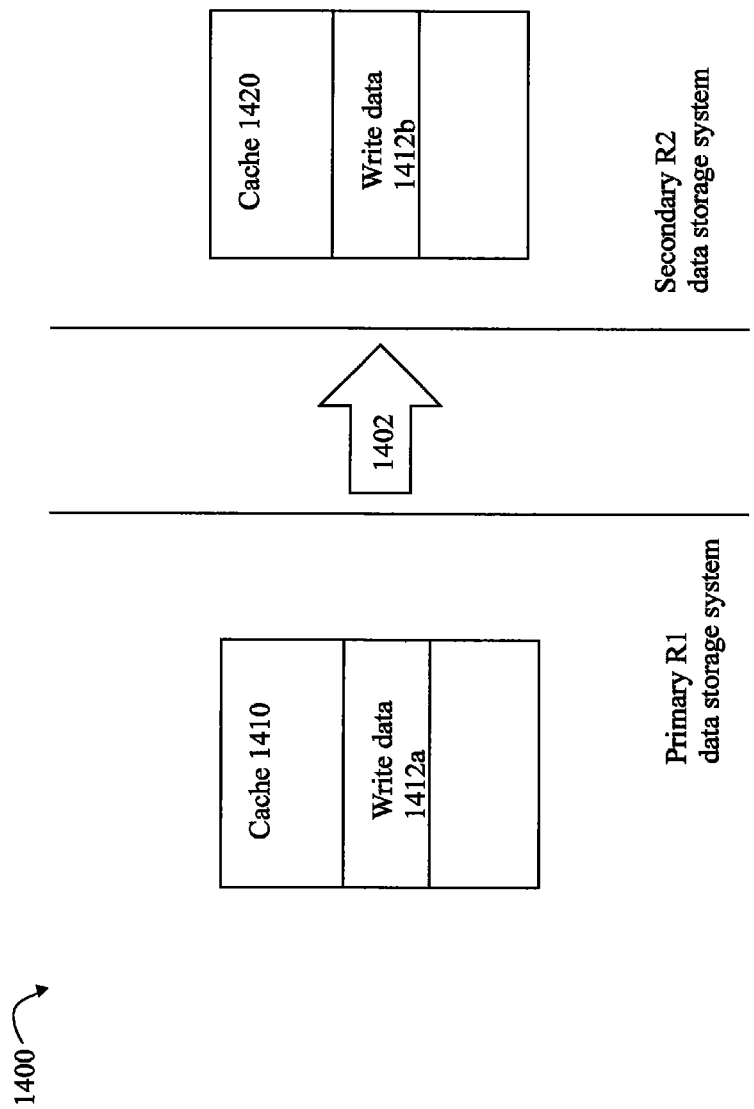
FIG. 18 is an example illustrating transmitting cycle data in an embodiment in accordance with techniques herein.

An embodiment may buffer all collected cycles of write data in cache on the R1 system such as illustrated in FIG. 18. In the example 1400, write data 1412a may denote the writes of one or more cycles of data stored in cache 1410 on the R1 data storage system. Writes of a cycle included in 1412a may be transmitted 1402 from the cache 1410 as described elsewhere herein for a transmit cycle. On the R2 system, the received cycle of write data 1412b may be stored in cache 1420 when received on the R2 data storage system. In one embodiment, the write data 1412a stored in cache on the R1 system may have a first format such as may vary with the particular cached format requirements for write operation data of captured cycles. When transmitting writes of a cycle, the write data for the cycle of 1412a may be read from cache 1410 and placed in a second format used for transmitting to the R2 system. This is described in more detail in following paragraphs. Element 1412b denotes the write data for a cycle received on the R2 system as may be stored in cache 1420 in a format different from 1412a. In one embodiment in accordance with techniques herein, a cycle of write data to be transmitted from the R1 system to the R2 system may be performed by buffering the cycle of write data in cache 1410 of the R1 system, transmitting the cycle of write data to the R2 system, and then storing the cycle of write data in the cache 1420 of the R2 system.

Although it may be desirable to keep all cycles of collected write data on the R1 system in the R1 system cache 1410, there may be an insufficient amount of cache 1410 to store all collected cycles of data on the R1 system/side. In this case, with reference to FIG. 19, an embodiment may perform processing to "spill over" or flush collected cycle data of the R1 system to disk, or more generally, a secondary storage device other than cache. An embodiment may, for example, spillover the most recent or newest cycle of collected data to disk. Thus, an embodiment may select cached cycle data for spillover to the secondary storage device based on a ranking of most recent cycle to oldest cycle whereby the most/more recent cycle of collected writes on R1 is flushed from cache to the secondary storage prior to any older cycles of collected writes on R1.

Figure 19:
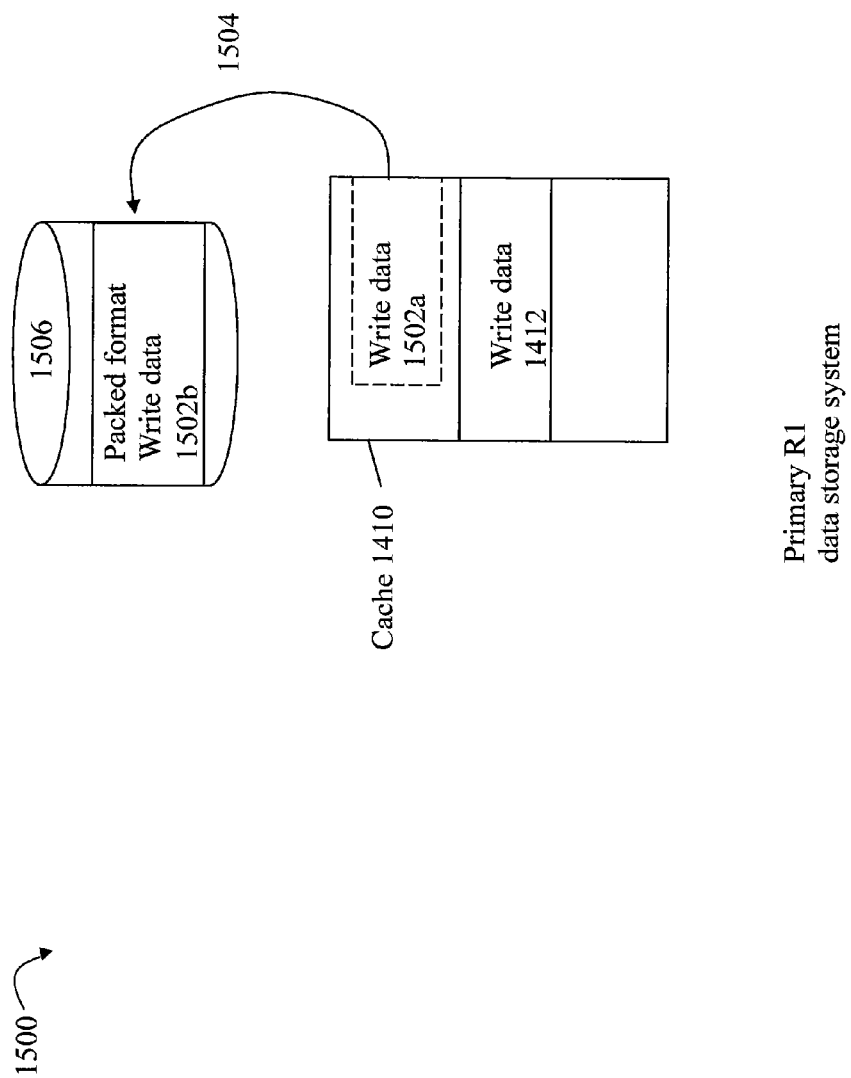
FIG. 19 is an example illustrating spillover processing that may be performed in an embodiment in accordance with techniques herein.

In FIG. 19, cache 1410 of the R1 system is illustrated as including the write data 1412 collected for a first set of one or more cycles, such as cycles 10-13. Subsequently, an additional cycle 14 of writes may be captured as denoted by write data 1502a. It may be determined that there is an insufficient amount of available or free cache after storing the write data 1502a and processing may be performed to spillover or flush 1504 the write data 1502a to the secondary storage device 1506. The write data 1502a may be stored in cache in the first format such as noted above which is transformed to a packed format 1502b when stored on the secondary storage device 1506. An example of a packed form or format that may be used in an embodiment in accordance with techniques herein is described in more detail below.

In at least one embodiment, the cached write data for a cycle data may be in different cached data formats depending on the particular R1 device to which the writes are directed. In the event that any cached write data of a cycle is spilled over to the secondary storage device 1506, such spilled over cycle write data may be stored on the secondary storage device in a common format, such as a fixed block format, native to the secondary storage device of the R1 system.

Figure 20:
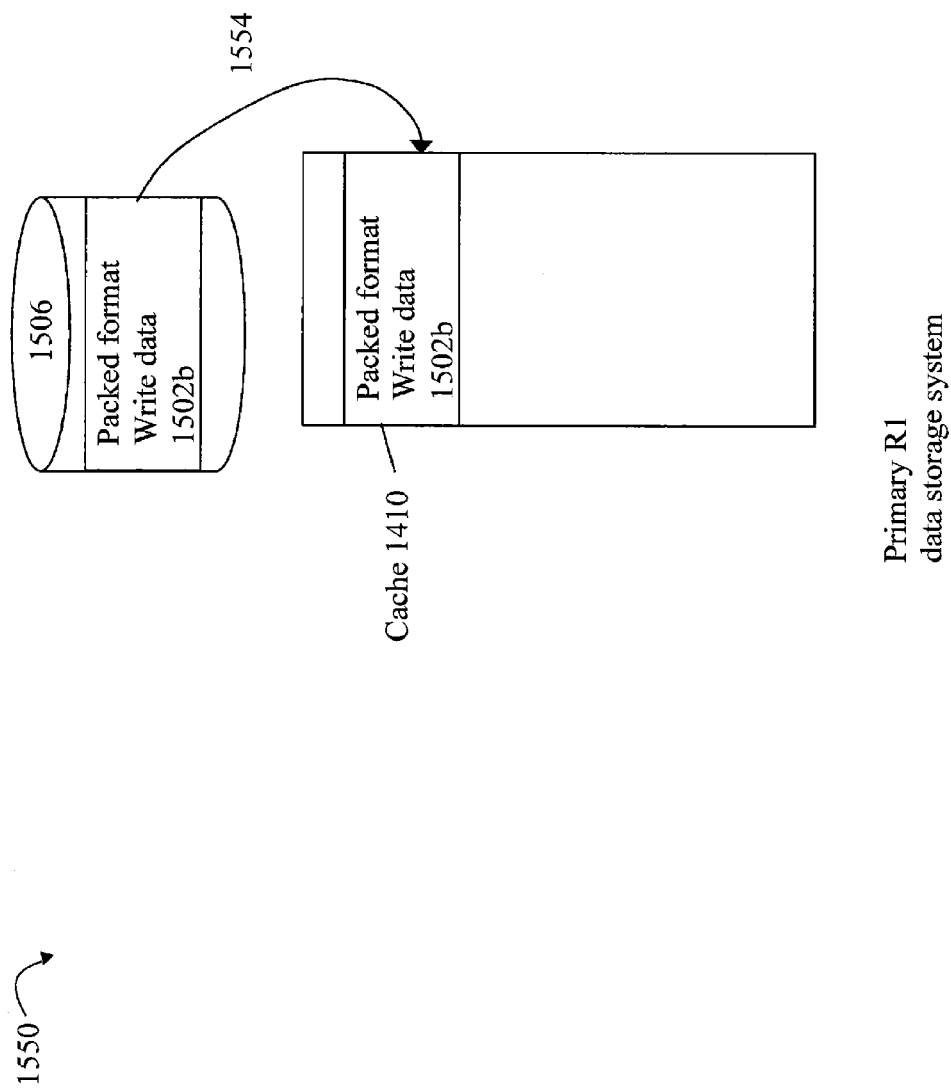
FIG. 20 is an example illustrating spillback processing that may be performed in an embodiment in accordance with techniques herein.

Continuing with the above example from FIG. 19, at a later point in time, processing may be performed to ready cycle 14 write data (as denoted by 1502b) for transmission in a transmit cycle from the R1 system to the R2 system. An embodiment may transmit a cycle of write data from the R1 system by reading such data from cache 1410. Thus, in preparation for transmission of cycle 14 write data, on the R1 side, processing may be performed as illustrated in FIG. 20 that may be referred to as spillback processing. With spillback processing, packed data that was previously flushed to the secondary storage device 1506 is now "spilled back" 1554 into cache (e.g., read from device 1506 to cache 1410) to ready the cycle 14 write data for transfer from R1's cache to the R2 system. In one embodiment, the packed form of write data 1502b may be retrieved from device 1506 and stored in cache 1410 in its same packed format. Furthermore, the packed write data 1502b may also be transmitted from the R1 to the R2 system in its packed format.

An embodiment in accordance with techniques herein may not spillover the current cycle of data which the host is currently writing (current cycle being captured) or the current cycle of data being transmitted (current transmit cycle) at any point in time. Thus, write data from such foregoing cycles at a particular point in time may be considered not eligible candidates for flushing to secondary storage in connection with spillover processing to reduce the amount of consumed R1 system cache. An embodiment may allow a partial cycle spillover whereby a portion of a cycle of write data that is less than the entire cycle collected on the R1 system may be stored on the secondary storage device 1506 rather than cache 1410. An embodiment may only perform spillover from cache to secondary storage on the R1 side but not spillover on the R2 side. On the R2 side, cycles of data may not spill over from cache to secondary storage. As mentioned above, an embodiment may store spilled over data on the secondary storage device 1506 of the R1 system in a packed format where multiple partial track writes may be combined into a single spilled track in a packed format generally illustrated in FIG. 21. In the example 1600, shown are 3 cache slots A, B and C of cache 1410 on the R1 system. Each of 3 cache slots A, B and C may hold data from write operations collected during a cycle where such writes are performed to tracks on the R1 device on the R1 system (e.g., where, as described herein, the writes to the R1 device are transmitted to the R2 system to have an R2 device that replicates such writes performed to the R1 device). Cache slot A illustrates data from a write operation of a cycle that writes only a partial amount of data 1602 of a first track of the R1 device. Cache slot B illustrates data from a write operation of a cycle that writes only a partial amount of data 1604 of a second track of the R1 device. Cache slot C illustrates data from a write operation of a cycle that writes only a partial amount of data 1606 of a third track of the R1 device. Element 1610 may generally illustrate the packed format whereby the partial track write data may be extracted from cache slots A-C and stored in a combined or packed format 1610, such as may be stored on the secondary storage device 1506 or in cache 1410 when spilled back to cache for subsequent transmission from the R1 system to the R2 system. Element 1603, 1605 and 1607 may denote uninitialized portions that do not include any write data.

Figure 21:
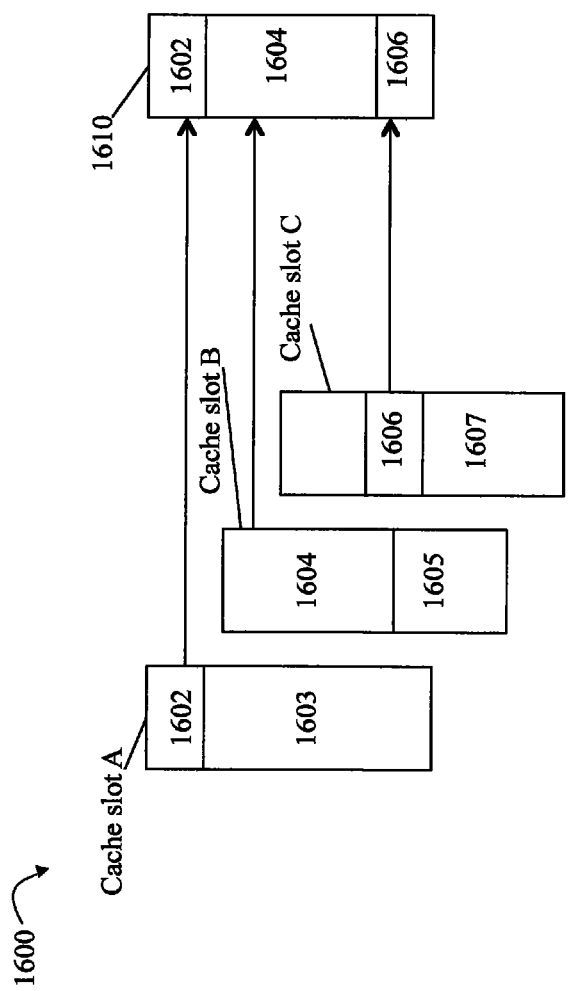
FIGS. 21 and 22 are examples illustrating an embodiment of a packed format that may be used with techniques herein.

As illustrated in FIG. 21 and also mentioned elsewhere herein, cycles of write data stored in cache may be stored in a cached format that is a different format other than the packed format. Cache slots A-C provide a general illustration of a cached unpacked format. For example, as illustrated in FIG. 21, an embodiment may store write data of a cycle for each track in a single cache slot even if the write data (such as 1602) only writes to a portion of the track. For example, assume cache slot A of FIG. 21 is 128K bytes which is 1 track, and a write is performed that writes data 1602 that is less than the entire 128K track. The single cache slot A includes the write data 1602 with remaining portions of the cache slot A padded with uninitialized portion 1603.

Element 1610 generally represents a packed format of a packed slot. The length of the packed slot may be selected to facilitate sequential storage on the secondary storage device. For example, in one embodiment, the secondary storage device to which the packed formatted write data 1610 is stored is included in a RAID (redundant array of independent disks) group. A RAID group generally includes multiple physical storage devices or members configured to provide varying levels of data protection based on the particular RAID level and RAID group configuration. For example, RAID levels include RAID-1 (data mirroring in the group), RAID-5, RAID-6, and the like. Within a RAID group, data may be stored across data members of the configured group in stripes. Thus, one embodiment may select a length of the packed slot to be equal to the stripe size, some multiple of the stripe size, have the length of the packed slot end on a stripe size boundary, and the like, to take advantage of sequentially reading and/or writing stripes of data to the secondary storage device(s) of the RAID group.

Packed format for spilled over data may include metadata where, for each partial track write, information stored in the packed format may include, for example, error correction code information, identify the offset or particular track location at which the partial write data is stored on the R1 device, and the like. It should be noted that data of a single write may span multiple packed slots whereby the single write may be in effect treated as 2 writes performed to logically successive or consecutive locations. Further details regarding packed format are provided in more detail below.

It should be noted that after a cache slot of the R1 system cache including write data for a cycle is either spilled over (e.g., stored from cache to secondary storage device) or otherwise transmitted to the R2 system, the cache slot may be free or made available for reuse.

When it is time to transfer a particular cycle of collected write data from the R1 system to the R2 system, the collected write data may include write data stored in a packed format that has been spilled back into cache of the R1 system in preparation for transmission. Also, the same cycle of write data may include write data stored in a cached format that is "unpacked" such as illustrated in cache slots A-C of FIG. 21. In such a case, cycle write data stored in the packed format in cache may be transmitted in its packed format which may be unpacked on the R2 system once received. Cycle write data from cache slots A-C may be transmitted in a different transmitted format. When cached write cycle data from cache slots A-C is transferred from the R1 to the R2 system, the "padding" or uninitialized portion 1603 of a cache slot is not transferred but rather only the write data 1602. Thus, the transmitted format of the cycle data that is stored in a cached format (as in cache slots A-C which are not the packed format) and then transmitted from the R1 system to the R2 system (such as in 1402 of FIG. 18) includes write data 1602, 1604, 1606 but not uninitialized portions 1603, 1605 and 1607.

Figure 22:
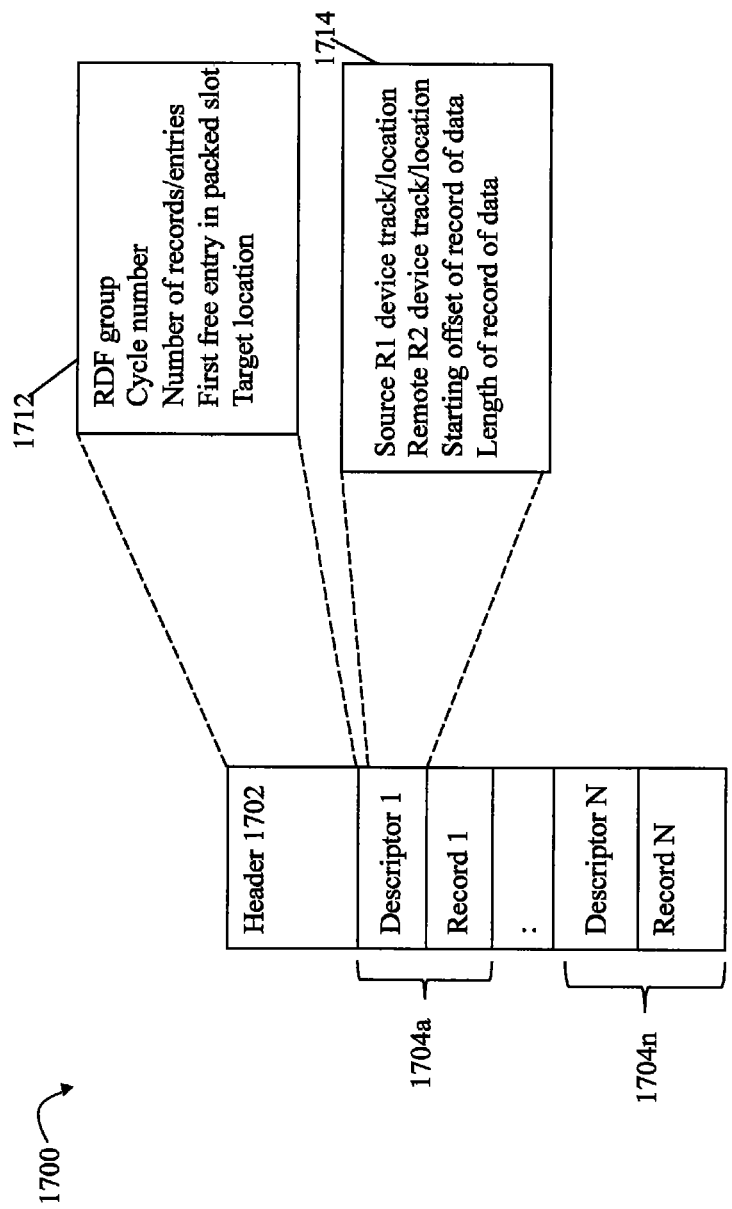

Referring to FIG. 22, shown is an example illustrating a packed format of write data as may be used in an embodiment in accordance with techniques herein. The example 1700 illustrates in more detail one layout of the packed format 1610 for a packed slot. The example 1700 includes a header 1702 for the packed slot followed by N entries or sets of descriptors and associated records of write data. The header 1702 generally includes metadata regarding the packed slot. Element 1712 illustrates in more detail information that may be included in header 1702 in an embodiment in accordance with techniques herein. The header 1702 may include, for example, the RDF group (denoting the RDF group to which the R1 device belongs, where records 1-N include write data directed to the R1 device), the cycle number (the cycle number of captured cycle of write data), the number of records or entries, such as N, in the packed slot, the first free entry in the packed slot, and the target location (e.g., such as LUN location—LUN and LBA (logical block address) or offset) of the secondary storage device where the packed slot is to be stored).

Element 1704a illustrates a first entry or set of a descriptor 1 and record 1. Each descriptor, such as descriptor 1, includes metadata about the particular write data stored in the associated record, such as record 1. Element 1714 illustrates in more detail information that may be stored in a descriptor, such as descriptor 1, for an entry 1704a in the packed slot. The descriptor 1 may include, for example, the source R1 device track/location (e.g., LUN, LBA of R1 device to which write data of record 1 is stored), the remote R2 device track/location (e.g., LUN, LBA of R2 device to which write data of record 1 is stored), starting offset of record of data (e.g., offset or location in the packed slot at which the record 1 starts), and the length of record of data (e.g., how many bytes is record 1—the write data represented by entry 1704a). Each of the descriptors of the packed slot 1700 may include information similar to that as illustrated by 1714 for descriptor 1 of 1704a.

In one embodiment, each entry (e.g., each of 1704a-n) in the packed slot may include write data for a single track, or cache slot, where such write data may be an extracted partial track of data written to the particular track of the R1 device. It should be noted that in one embodiment using the structure as in FIG. 22, write data from different cycles may not be included in the same packed slot.

In order to support multiple cycle mode, an embodiment may track metadata for each cycle of collected data on the R1 system in a special type of cache slot which may be referred to as a cycle information cache slot. It may be that there are multiple cycle information cache slots which may be included in a linked list structure.

Figure 23:
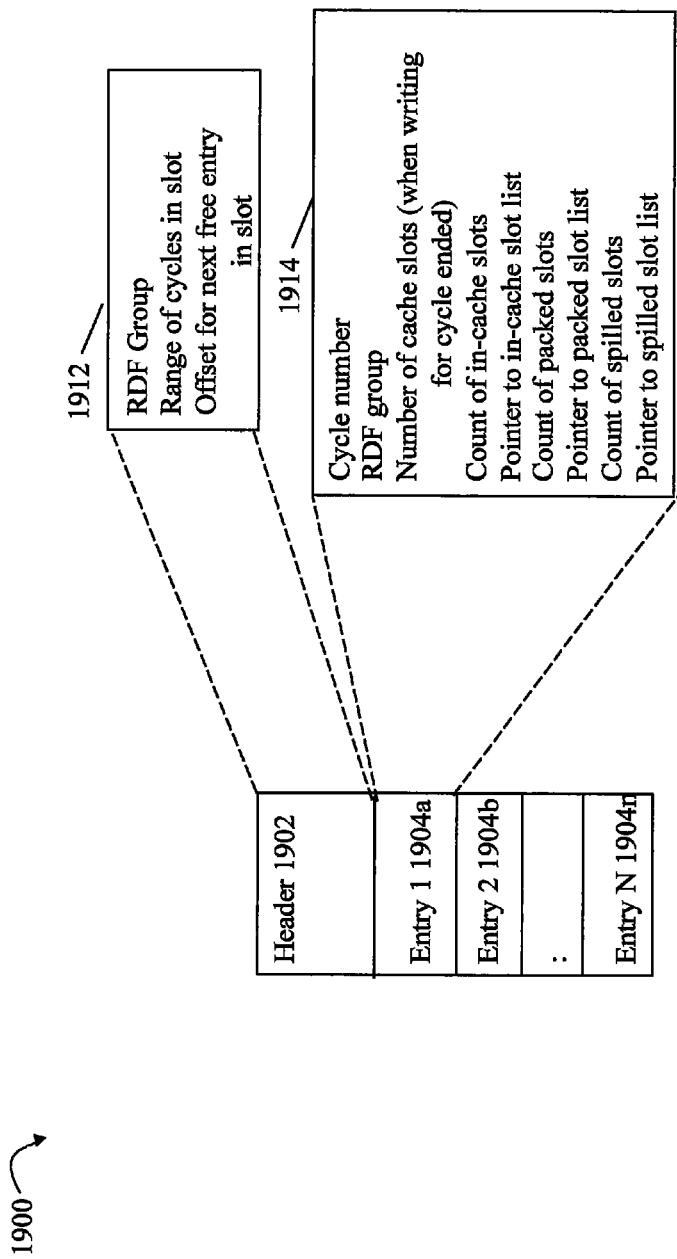
FIG. 23 is an example of information that may be included in a cycle information cache slot in an embodiment in accordance with techniques herein.

Referring to FIG. 23, shown is an example of information that may be stored in a cycle information cache slot in an embodiment in accordance with techniques herein. The example 1900 illustrates in more detail one layout of the cycle information cache slot format. The example 1900 includes a single header 1902 and multiple entries 1904a-n where there is a single entry for each cycle of collected write data.

The header 1902 generally includes metadata regarding the particular instance of the cycle information cache slot. Element 1912 illustrates in more detail information that may be included in header 1902 in an embodiment in accordance with techniques herein. The header 1902 may include, for example, the RDF group, a range of cycles having entries in the slot, and an offset for the next free entry in the slot.

Element 1904a illustrates a first entry in the slot for a single cycle of captured write data. Element 1914 illustrates in more detail information that may be stored in an entry. The entry may include, for example, the cycle number of the entry, the RDF group, the number of cache slots in this cycle (total number consumed or used when writing for the cycle ended before any spillover may have been performed), count of in-cache slots (e.g., current number of cache slots storing write data for the cycle of this entry), pointer to in-cache slot list, count of packed slots (e.g., current number of cache slots including packed format data for the cycle to this entry), pointer to packed slot list (of packed slots currently stored in cache), count of spilled slots (e.g., current number of packed slots which are spilled over or stored on secondary storage rather than cache for this cycle), and pointer to list of spilled slots (e.g., may identify location on secondary storage of the first entry of the list of spilled packed slots).

Figure 24:
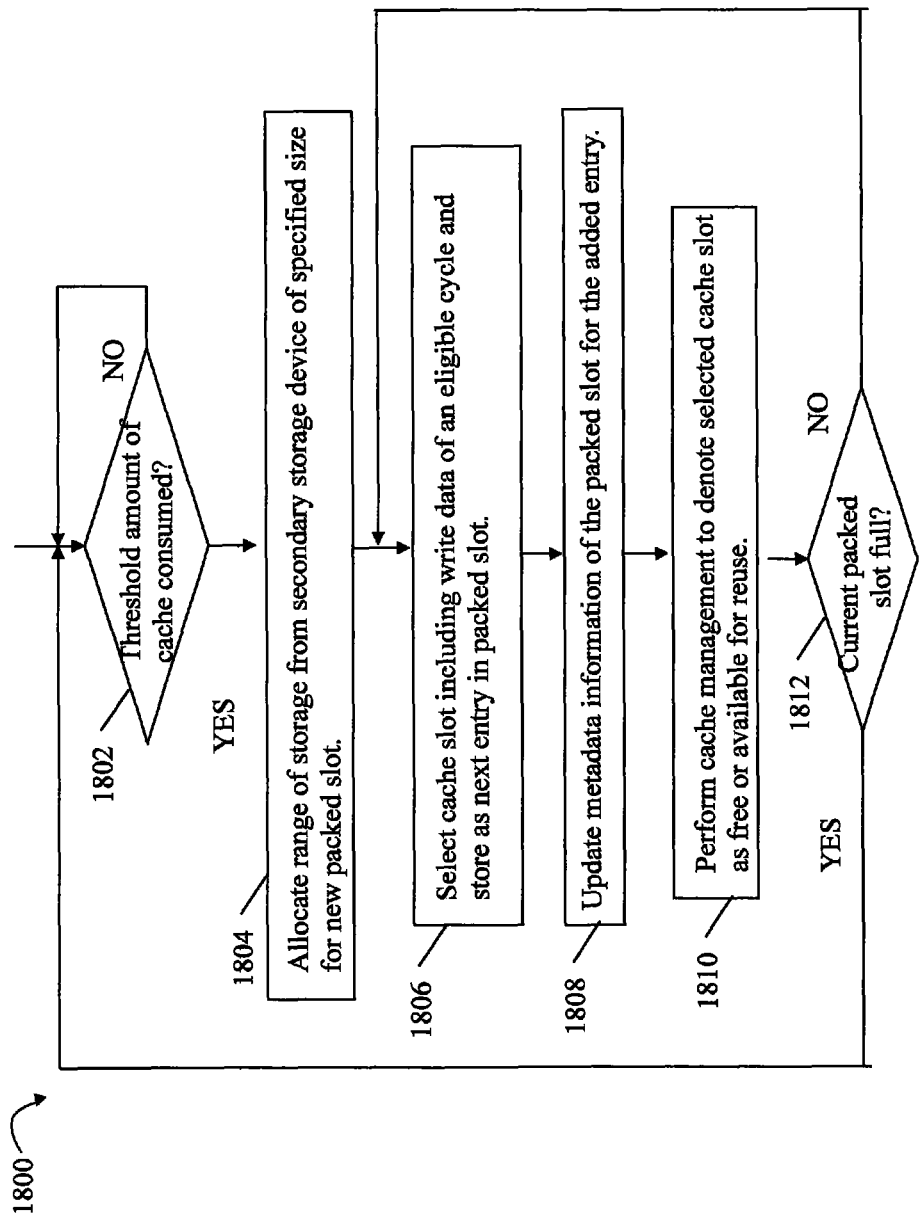

Referring to FIG. 24, shown is a flowchart 1800 of processing steps that may be performed in an embodiment in connection with spillover processing. In step 1802, a determination may be made as to whether a threshold amount of cache has been consumed. Processing may remain at step 1802 until it evaluates to yes. Generally, step 1802 represents a trigger condition that, when evaluates to true, causes spillover processing to be performed. Upon step 1802 evaluating to true, control proceeds to step 1804. At step 1804, processing may be performed to allocate a range of storage from the secondary storage device of a specified size for a new packed slot. At step 1806, a cache slot from the R1 system cache is selected. The selected cache slot includes write data of an eligible cycle. As noted elsewhere herein, there may be certain cycles of write data excluded as candidates for destaging from cache to secondary storage. For example, write data of a current cycle which is being captured or written to by the host is excluded. As part of step 1806, processing may be performed to store the write data of the selected cache slot as the next entry in the current packed slot. In step 1808, processing may be performed to update any needed metadata information of the packed slot for the added entry. Step 1808 may include, for example, updating the descriptor associated with the added entry, updating the header of the packed slot, and the like. At step 1810, cache management may be performed to denote the selected cache slot as free or available for reuse. At step 1812, a determination may be made as to whether the current packed slot is full with no remaining entries. If step 1812 evaluates to no, control proceeds to step 1806 to select another cache slot for destaging to the secondary storage device. If step 1812 evaluates to yes, control proceeds to step 1802. In this example, control may return to step 1802 from step 1812 to re-evaluate the current amount of consumed cache.

It should be noted that processing of FIG. 24 may generally use and/or update the information in one or more cycle information cache slots (e.g., as in FIG. 23) for cycle Y and packed slot(s) (e.g., as in FIG. 22) in connection with illustrated processing steps.

It should be noted that accessing any data structure, such as the packed slot, which may be used by multiple processes, threads, and the like, may use any suitable synchronization mechanism known in the art, such as locks, when performing processing as described herein to ensure updates are performed properly.

Following are some additional processing that may be performed in an embodiment in accordance with techniques herein.

On the R1 system, it should be noted that there may be an overwrite or multiple writes to the same logical address L1 of the R1 device. The multiple writes may be in different cycles that have not yet been transferred to the R2 system. For example, there may be a first write to L1 in cycle 12 and a second write to L1 in cycle 13 and write data of both cycles 12 and 13 may still be awaiting transfer from R1 to R2. In this case, assume there is a first cache slot including the first write data from cycle 12. An additional second cache slot is allocated and used to store the second write to L1 in cycle 13. An embodiment in accordance with techniques herein may not overwrite a cache slot including write data for a cycle of data that has not yet transferred from the R1 to the R2 system.

On the R1 system, there may be a drive failure for the R1 device and a read operation may be issued by the host to read data from the failed R1 device. In this case, an embodiment may perform processing to obtain the requested read data from the replicated R2 device of the R2 system. Such processing may include allocating a scratch cache slot on the R1 side, and sending the read request to the R2 system. The R2 system may traverse any cycles of data it has already received from the R1 system, along with any requested read data from the R2 device, to build a most current or recent copy of the requested read data and then return such data to the R1 system. On the R1 side, further processing may be performed to additionally merge the older data received from the R2 system (based on older cycles of write data) with any other copies of write pending data, such as may be stored in the R1 system cache, relevant to the read request and return the requested read data to the host.

Figure 25:
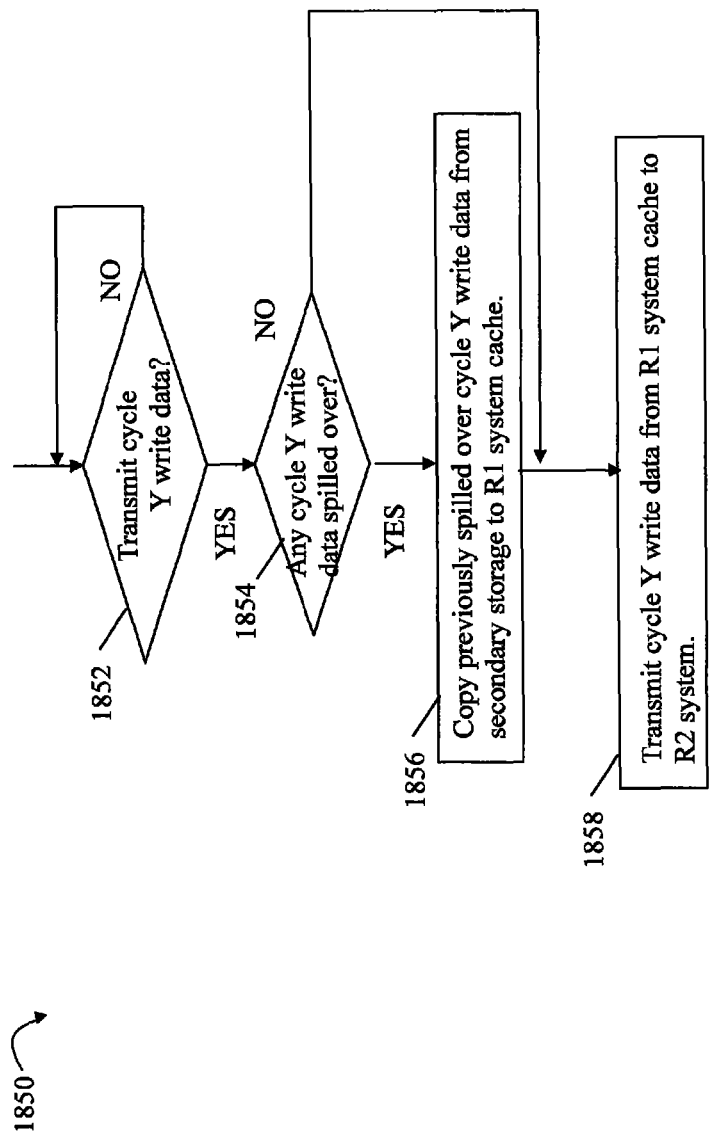

Referring to FIG. 25, shown is a flowchart of processing steps that may be performed in an embodiment in accordance with techniques herein. The flowchart 1850 generally summarizes processing that may be performed in connection with preparation for transmitting a cycle Y of write data from the R1 system to the R2 system (Y being a non-zero integer generally denoting a particular cycle number of data as described elsewhere herein). At step 1852, a determination is made as to whether it is time to begin preparation processing for transmitting cycle Y write data. Control remains at step 1852 until step 1852 evaluates to yes Once step 1852 evaluates to yes, control proceeds to step 1854 where a determination is made as to whether any write data of cycle Y has been previously spilled over to a secondary storage device whereby if any portion of cycle Y data was spilled over, then not all of cycle Y's write data is currently stored in the R1 system cache. If step 1854 evaluates to yes, control proceeds to step 1856 where processing is performed to copy the previously spilled over cycle Y write data from secondary storage to the R1 system cache. Step 1856 may also include denoting that the portion of the secondary storage at which the cycle Y write data was stored may now be reused. From step 1856, processing proceeds to step 1858. If step 1854 evaluates to no, control proceeds to step 1858. In step 1858, processing is performed to transmit the cycle Y write data from the R1 system cache to the R2 system.

It should be noted that processing of FIG. 25 may use and/or update the information in one or more cycle information cache slots (e.g., as in FIG. 23) for cycle Y and packed slot(s) (e.g., as in FIG. 22) in connection with illustrated processing steps, for example, such as to determine whether any cycle Y write data is current stored on secondary storage, and if so, the particular location on secondary storage of such cycle write data.

An embodiment in accordance with techniques herein may operate in a legacy mode if one of the R1 or R2 systems does not support pre-transfer mode and also does not support multiple cycle mode (e.g., as described herein where there may be more than two cycles of data on the R1 and/or R2 systems). Thus, a legacy data storage system may be referred to as one that has an older version of software running thereon that does not support operating in the pre-transfer mode and does not support operating the multiple cycle mode as described herein. A legacy R1 data storage system not supporting multiple cycle mode has only two cycles of write data—cycle N that is currently being collected and a second older cycle N−1 of data that is being transmitted to the R2 system and waiting to be applied by the R2 system to the R2 device. Similarly, a legacy R2 system also has only 2 cycles of data for cycles N−1 and N−2—cycle N−1 data that is waiting to be completely received and then awaiting application to the R2 device, and cycle N−2 data that is currently being applied to the R2 device. Thus, a legacy R1 system not supporting multiple cycle mode may collect two larger cycles of data spanning variable periods of time. A cycle of write data collection N on the legacy R1 system may end and another cycle N+1 data collection on the R1 system may begin once the R1 system receives the acknowledgement from the R2 system that it has applied/committed the N−2 cycle write data and has received all the cycle N−1 write data which can now be applied on the R2 side.

Consider the case where the R1 system supports multiple cycle mode and pre-transfer mode (is not a legacy system) and the R2 system does not support pre-transfer mode and does not support multiple cycle mode (is a legacy system). In the case where the R1 system supports multiple cycle mode and the R2 system does not (e.g., supports only two data cycles), the R1 system may operate in multiple cycle mode to collect a new set of cycle data at each fixed interval as described herein. However, the R1 system may package together multiple smaller cycles into two larger legacy cycles of write data as may be known to the R2 system. The R1 system may continue to operate in multiple cycle mode by collecting multiple cycles of write data at fixed intervals and may use the legacy cycle number when communicating with the R2 system. The R1 system may accordingly increment the legacy cycle number in response to acknowledgements and messages from the R2 legacy system. For example, when the R1 system increments the legacy cycle number from N to N+1 (e.g., when the R1 system performs a cycle switch such as in response to receiving an acknowledgement from the R2 system that the cycle N−1 data has been completely received and that the R2 system has also finished applying cycle N−2 data), the R1 system may record the start cycle number for the new legacy number and the end cycle of the previous legacy number.

In a second case, the R1 system may not support multiple cycle mode (e.g., R1 system is a legacy system) and the R2 system may support multiple cycles. In this case, the R2 system does not have more than two cycles of data for cycles N−1 and N−2, and the R1 system may not have more than two cycles of data for cycles N and N−1 due to the manner in which the R1 system operates. As mentioned elsewhere herein, in legacy R1 and R2 systems not supporting multiple cycle mode and not supporting pre-transfer mode, at a point in time, both the R1 and R2 systems have at most 2 cycles of data—the R1 system may collect data for cycle N (writes made to the R1 device) and transmit data for cycle N−1, and the R2 system may receive data for cycle N−1 and apply data for cycle N−2 to the R2 device. The R1 system may perform a cycle switch from N to N+1 responsive to receiving an acknowledgement from the R2 system that is has both received all of cycle N−1 data and has also finished applying cycle N−2 data to the R2 device. Additionally, once the R1 system switches the cycle number to cycle N+1, the R1 system commences collecting write data for cycle N+1 and begins transmitting cycle N write data to the R2 system.

In connection with an R2 system that is a legacy data storage system and the R1 data storage system is not whereby the R1 system supports multiple cycle mode and pre-transfer mode, any packed slots on the R1 system may be unpacked prior to transmission to the R2 system. This may be performed under the assumption that the packed slot format is used in connection with systems that support the multiple cycle mode and that the packed slot format is not used in legacy data storage systems that do not support the multiple cycle mode.

Figure 26:
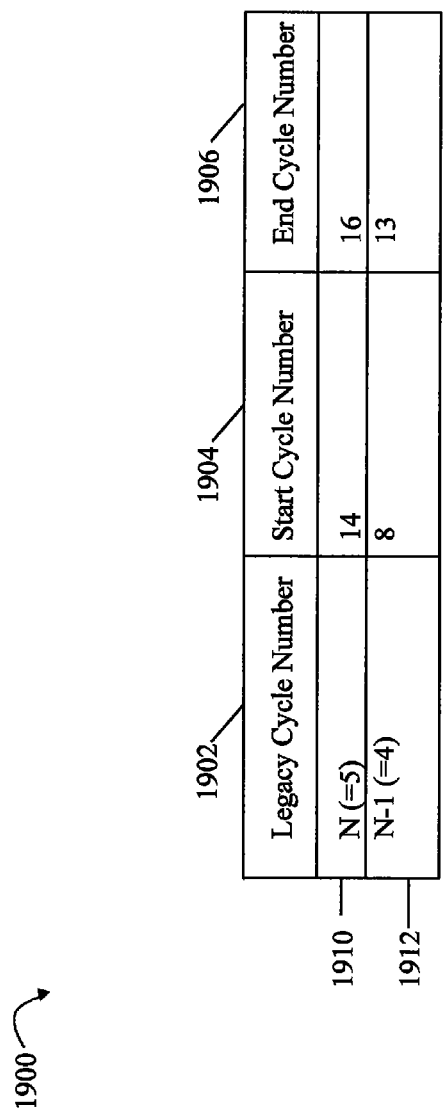
FIG. 26 is an example of cycle number information that may be tracked and used in an embodiment in accordance with techniques herein.

Referring to FIG. 26, shown is an example 1900 illustrating a table of information that may be recorded and used in an embodiment in accordance with techniques herein to support operating in legacy mode for use when communicating with a legacy data storage system that does not support multiple cycle mode as described herein. The example 1900 is a table including 3 columns—legacy cycle number 1902, start cycle number 1904 and end cycle number 1906. Column 1902 includes the legacy cycle numbers and columns 1904 and 1906 specify a range of smaller cycle numbers used in the multiple cycle mode. For a given row of the table, such as row 1910, column 1902 denotes that the legacy cycle number N=5 includes write data from cycles 14-16 (as identified in columns 1904 and 1906, respectively, of row 1910) of the multiple cycle mode. Similarly, in row 1912, column 1902 denotes that the legacy cycle number N−1=4 includes write data from cycles 8-13 (as identified in columns 1904 and 1906, respectively, of row 1912) of the multiple cycle mode. A data storage system, such as an R1 system, which supports the legacy mode of operation and also operates in accordance with the multiple cycle mode may store information as in FIG. 26 for the current legacy number "N" and the previous legacy number "N−1" for use when communicating with another legacy data storage system that does not support the multiple cycle mode as described herein. The multiple cycle mode cycles numbers of columns 1904 and 1906 may also be referred to as non-legacy mode cycle numbers.

Figure 27:
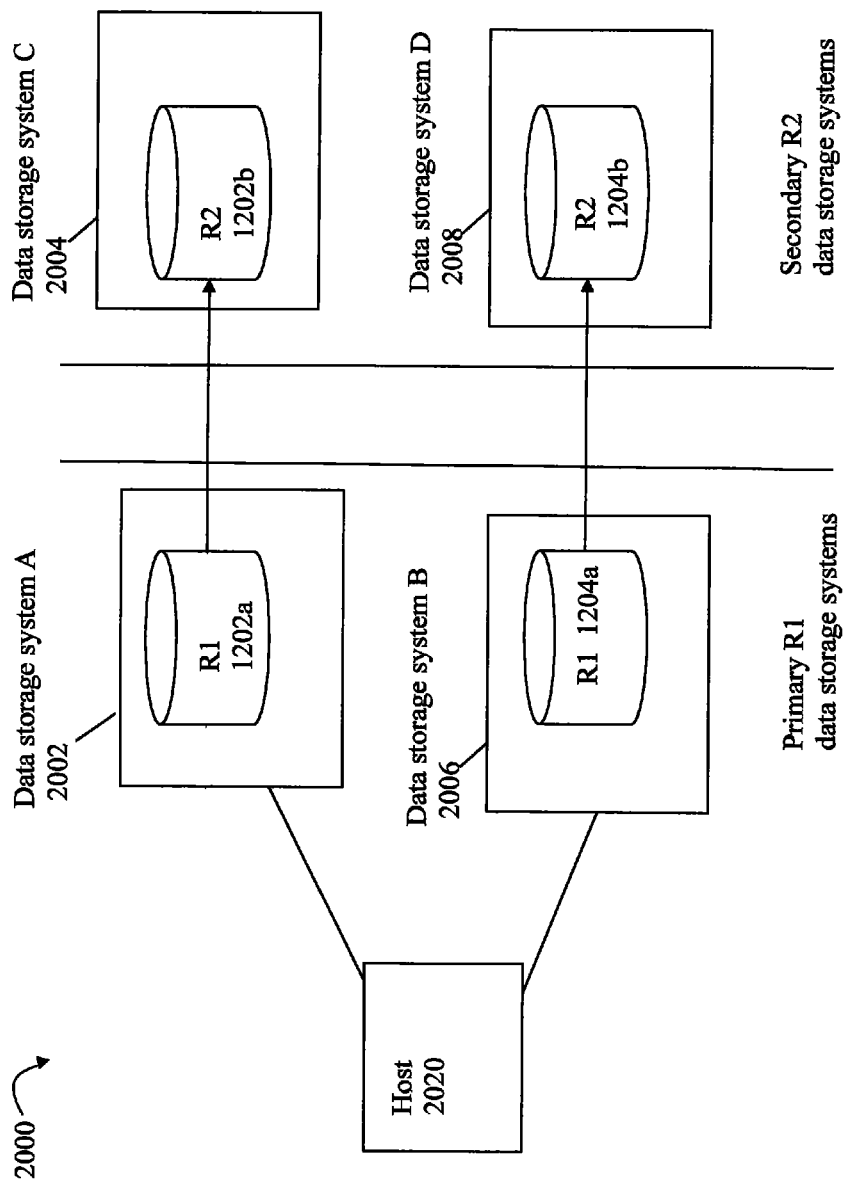
FIG. 27 is an example illustrating components that may be included in an embodiment in accordance with techniques herein.

With reference to FIG. 27, an embodiment in accordance with techniques herein may support multi-box mode where writes are performed across multiple data storage systems or "boxes". Multi-box mode may also be referred to as multiple-data storage system consistency (MSC) mode. As illustrated in the example 2000, there may be 2 R1 data storage systems—data storage system A 2002 and data storage system B 2006. There may also be 2 R2 data storage systems—data storage system C 2004 and data storage system D 2008. The host 2020 may be connected to data storage systems A and B and viewing the collective or aggregate R2 devices 1202a and 1204a of data storage systems A and B as a single cohesive data set.

Data storage system A 2002 may be connected to data storage system C 2004 and perform processing as described herein for an RDF connection to propagate cycles of write data from R1 data storage system A 2002 to R2 data storage system C 2004. Data storage system B 2006 may be connected to data storage system D 2008 and perform processing as described herein for an RDF connection to propagate cycles of write data from R1 data storage system B 2006 to R2 data storage system D 2008.

In this example 2000, all 4 data storage systems A, B, C and D may support and operate in accordance with the multiple cycle mode and the pre-transfer mode as described herein. In such an embodiment, techniques may be performed to synchronize processing on the data storage systems A, B, C and D. An embodiment may synchronize on two points. As a first point of synchronization, processing may be performed to synchronize on systems A and B on the R1 side when new cycles of data are created or captured. For example, processing is performed to coordinate the start of data collection of a new cycle of write data on A and B to occur at the same time. An embodiment may pause writes on both systems A and B, add a new cycle number on both systems, mark the end of the current cycle number and associated writes, and then let writes resume whereby such new writes are now included in the new cycle number. In one embodiment described herein, the host 2020 may include software controlling the synchronization and may communicate with the R1 data storage system A and B (2002 and 2006) thereby providing them both a signal of when to commence starting data collection of a new next cycle of write data.

As a second point of synchronization, processing may be performed to synchronize on the application of an older cycle of data on the R2 systems. For example, a host may issue a command and otherwise communicate to data storage systems A and B to control such application of data on R2 data storage systems C and D. To further illustrate, R1 systems A and B may have sent all of cycle 16 data to R2 systems C and D. R1 systems A and B have notified systems C and D that all cycle 16 has been sent (cycle 16 transfer is complete) and systems C and D acknowledge to systems A and B that such complete set of cycle 16 data has been received and also that cycle 15 data has been applied. The R1 systems A and B both notify the host that the R2 systems are now ready to apply or commit cycle 16 data on the R2 systems C and D. The host then issues a command to the R1 systems A and B to instruct the R2 systems C and D to commit or apply cycle 16 write data. The R1 systems A and B may each respectively send such instruction to the R2 systems C and D. The R2 systems C and D may each send an acknowledgement, respectively, to the R1 systems A and B when both the cycle 16 data has been applied or committed and cycle 17 data has been completely received. This second point of synchronization is needed to ensure that both R2 devices 1202b, 1204b of the R2 data storage systems have the same consistency point with respect to a same set of write cycle data.

It should be noted that although the host is illustrated and described as performing the foregoing two points of synchronization processing, more generally, such synchronization may be performed by any suitable component in communication with the R1 data storage systems.

It should be noted that techniques are described herein where a data storage system may support and operate in accordance with various modes such as the pre-transfer mode, multiple cycle mode, legacy mode and multi-box or MSC mode. More generally, an embodiment of a data storage system in accordance with techniques herein may support and operate in accordance with any one or more of such modes. For example, an embodiment of a data storage system may, for example, support and operate in accordance with just the multiple cycle mode. An embodiment of a data storage system may, for example, support and operate in accordance with the multiple cycle mode and legacy mode but without the pre-transfer mode or MSC mode. An embodiment of a data storage system may, for example, support and operate in accordance with the multiple cycle mode and the pre-transfer mode but without legacy mode and without the MSC mode.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data replication comprising:
   collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein writes of cycle N denotes a most recent one of the Y cycles of writes collected, N being an integer identifying a particular fixed interval occurrence during which writes directed to the first storage device are received;
   transmitting writes of cycle N−1 directed to the first storage device from the first data storage system to a second data storage system;
   applying writes of cycle N−2 directed to the first storage device to a second storage device of the second data storage system;
   determining when the writes of cycle N−1 directed to the first storage device have been received by the second data storage system and when the writes of cycle N−2 directed to the first storage device have been applied to the second storage device;
   sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device; and
   determining whether it is time to commence preparation processing to transmit writes for a first of the Y cycles from the first data storage system to the second data storage system, and wherein, prior to performing said preparation processing, a first portion of writes of the first cycle are stored on one or more secondary storage devices in a packed format and a remaining portion of the writes of the first cycle are stored in a first cache of the first data storage system, and wherein said preparation processing includes storing the first portion of writes of the first cycle in the first cache in the packed format.

2. The method of claim 1, further comprising:
transmitting at least some of the writes of cycle N directed to the first storage device from the first data storage system to the second data storage system prior to the first data storage system receiving the acknowledgement regarding cycle N−1.

3. The method of claim 1, wherein the first storage device and the second storage device are logical devices.

4. The method of claim 1, wherein no write from cycle N−1 directed to the first storage device is applied to the second storage device until all writes of cycle N−2 directed to the first storage device are applied to the second storage device.

5. The method of claim 4, wherein no write from cycle N directed to the first storage device is applied to the second storage device until all writes of cycle N−1 directed to the first storage device are applied to the second storage device.

6. The method of claim 1, further comprising:
performing a cycle switch to set a current cycle number to N responsive to the first data storage system receiving the acknowledgement regarding cycle N−1, wherein transmitting at least some of the writes of cycle N that are directed to the first storage device to the second data storage system is performed prior to performing the cycle switch to cycle N.

7. The method of claim 1, wherein the second data storage system determines that writes of cycle N−1 directed to the first storage device have been applied to the second storage device when write data of each write included in cycle N−1 directed to the first storage device is any of: stored as write pending data in a cache of the second data storage system, and destaged to a location on a physical storage device provisioned for the second storage device.

8. The method of claim 1, wherein at least some writes of the Y cycles are stored in the first cache of the first data storage system and the method further comprising:
determining that a maximum threshold amount of the first cache of the first data storage system has been consumed; and
responsive to determining that the maximum threshold amount of the first cache has been consumed, performing spillover processing to move a portion of writes of the Y cycles from the first cache to the one or more secondary storage devices.

9. The method of claim 8, wherein said spillover processing further comprises:
selecting a plurality of cache slots from the first cache including the portion of writes;
storing write data for the portion of writes in the packed format in a first set of one or more packed slots on the one or more secondary storage devices; and
denoting the plurality of cache slots of the first cache as free and available for reuse.

10. The method of claim 9, further comprising:
responsive to determining it is time to commence said preparation processing to transmit writes for the first cycle, performing said preparation processing comprising:
determining whether any writes of the first cycle are currently stored on the one or more secondary storage devices thereby indicating that said spillover processing has been performed for at least some writes of the first cycle; and
if it is determined that any writes of the first cycle are currently stored on the one or more secondary storage devices, performing spillback processing to move writes of the first cycle currently stored on the one or more secondary storage devices to the first cache of the first data storage system.

11. A method of performing data replication comprising:
collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein writes of cycle N denotes a most recent one of the Y cycles of writes collected, N being an integer identifying a particular fixed interval occurrence during which writes directed to the first storage device are received;
transmitting writes of cycle N−1 directed to the first storage device from the first data storage system to a second data storage system;
applying writes of cycle N−2 directed to the first storage device to a second storage device of the second data storage system;
determining when the writes of cycle N−1 directed to the first storage device have been received by the second data storage system and when the writes of cycle N−2 directed to the first storage device have been applied to the second storage device; and
sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device, wherein writes of the Y cycles are stored in a first cache of the first data storage system and the method further comprises:
determining that a maximum threshold amount of the first cache of the first data storage system has been consumed; and
responsive to determining that the maximum threshold amount of the first cache has been consumed, performing spillover processing to move a first portion of writes of the Y cycles from the first cache to one or more secondary storage devices, and wherein said spillover processing further comprises:
selecting a plurality of cache slots from the first cache including the first portion of writes;
storing write data for the first portion of writes in a packed format in a first set of one or more packed slots on the one or more secondary storage devices; and
denoting the plurality of cache slots of the first cache as free and available for reuse, and wherein the method further comprises:
determining whether it is time to commence preparation processing to transmit writes for a first of the Y cycles from the first data storage system to the second data storage system;
responsive to determining it is time to commence said preparation processing, performing said preparation processing comprising:
determining whether any writes of the first cycle are currently stored on the one or more secondary storage devices thereby indicating that said spillover processing has been performed for at least some writes of the first cycle; and
if it is determined that any writes of the first cycle are currently stored on the one or more secondary storage devices, performing spillback processing to move writes of the first cycle currently stored on the one or more secondary storage devices to the first cache of the first data storage system, and wherein, prior to performing said preparation processing, a first portion of writes of the first cycle are stored on the one or more secondary storage devices in the packed format and a remaining portion of the writes of the first cycle are stored in the first cache, and wherein said preparation processing includes storing the first portion of writes of the first cycle in the first cache in the packed format.

12. A non-transitory computer readable medium comprising code stored thereon that, when executed, performs a method of data replication comprising:

collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein the first data storage system operates in accordance with a multiple cycle mode, a pre-transfer mode and a legacy mode, and wherein a second data storage system is a legacy data storage system and does not operate in accordance with the multiple cycle mode and does not operate in accordance with the pre-transfer mode;

tracking, by the first data storage system, a mapping of multiple cycles of the multiple cycle mode to each legacy cycle used by the second data storage system, wherein the Y cycles denote cycles of the multiple cycle mode and wherein each legacy cycle used by the second data storage system includes a plurality of cycles of writes collected by the first data storage system in accordance with the multiple cycle mode;

receiving writes of a legacy cycle A directed to the first storage device, A being an integer denoting a particular legacy cycle number;

transmitting writes of legacy cycle A−1 directed to the first storage device from the first data storage system to the second data storage system;

applying writes of legacy cycle A−2 directed to the first storage device to a second storage device of the second data storage system;

determining when the writes of legacy cycle A−1 directed to the first storage device have been received by the second data storage system and when the writes of legacy cycle A−2 directed to the first storage device have been applied to the second storage device; and sending, from the second data storage system to the first data storage system, an acknowledgement regarding legacy cycle A−1 responsive to determining that the writes of legacy cycle A−1 directed to the first storage device have been received by the second data storage system and that the writes of legacy cycle A−2 directed to the first storage device have been applied to the second storage device.

13. The non-transitory computer readable medium of claim 12, the method further comprising:

responsive to the first data storage system receiving, from the second data storage system, the acknowledgement regarding legacy cycle A−1, updating a current legacy cycle to A and commencing transmission of legacy cycle A writes from the first data storage system to the second data storage system.

14. The non-transitory computer readable medium of claim 12, wherein the first storage device and the second storage device are logical devices.

15. A system comprising:

a processor; and a memory comprising code stored thereon that, when executed, performs a method of data replication comprising:

collecting Y cycles of writes directed to a first storage device of a first data storage system, Y being an integer greater than two denoting a count of a number of cycles of writes collected, wherein each of the Y cycles of writes denotes writes directed to the first storage device at an occurrence of a fixed time interval, wherein writes of cycle N denotes a most recent one of the Y cycles of writes collected, N being an integer identifying a particular fixed interval occurrence during which writes directed to the first storage device are received;

transmitting writes of cycle N−1 directed to the first storage device from the first data storage system to a second data storage system;

applying writes of cycle N−2 directed to the first storage device to a second storage device of the second data storage system;

determining when the writes of cycle N−1 directed to the first storage device have been received by the second data storage system and when the writes of cycle N−2 directed to the first storage device have been applied to the second storage device;

sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device; and determining whether it is time to commence preparation processing to transmit writes for a first of the Y cycles from the first data storage system to the second data storage system, and wherein, prior to performing said preparation processing, a first portion of writes of the first cycle are stored on one or more secondary storage devices in a packed format and a remaining portion of the writes of the first cycle are stored in a first cache of the first data storage system, and wherein said preparation processing includes storing the first portion of writes of the first cycle in the first cache in the packed format.

* * * * *